US008466216B2

(12) United States Patent
Goulet et al.

(10) Patent No.: US 8,466,216 B2
(45) Date of Patent: Jun. 18, 2013

(54) LOW ODOR BINDERS CURABLE AT ROOM TEMPERATURE

(75) Inventors: Mike Thomas Goulet, Neenah, WI (US); Tracy Ho Mathews, Neenah, WI (US); Stacey Lynn Pomeroy, DePere, WI (US); Maurizio Tirimacco, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 972 days.

(21) Appl. No.: 11/787,300

(22) Filed: Apr. 16, 2007

(65) Prior Publication Data

US 2007/0194274 A1 Aug. 23, 2007

Related U.S. Application Data

(60) Division of application No. 10/893,209, filed on Jul. 15, 2004, now Pat. No. 7,229,529, which is a continuation-in-part of application No. 10/654,556, filed on Sep. 2, 2003, now Pat. No. 7,189,307.

(51) Int. Cl.
*C08G 59/50* (2006.01)
(52) U.S. Cl.
USPC .......................................................... 523/400
(58) Field of Classification Search
USPC ............................... 523/409, 400; 252/182.12
See application file for complete search history.

(56) References Cited

U.S. PATENT DOCUMENTS

| 2,624,245 | A |   | 1/1953  | Cluett           |
|-----------|---|---|---------|------------------|
| 3,011,545 | A |   | 12/1961 | Welsh et al.     |
| 3,017,317 | A |   | 1/1962  | Voigtman at al.  |
| 3,096,228 | A |   | 7/1963  | Day et al.       |
| 3,260,778 | A |   | 7/1966  | Walton           |
| 3,301,746 | A |   | 1/1967  | Sanford et al.   |
| 3,329,556 | A |   | 7/1967  | McFalls at al.   |
| 3,338,858 | A |   | 8/1967  | Strasser et al.  |
| 3,359,156 | A |   | 12/1967 | Freuler et al.   |
| 3,416,192 | A |   | 12/1968 | Packard          |
| 3,426,405 | A |   | 2/1969  | Walton           |
| 3,554,863 | A |   | 1/1971  | Hervey et al.    |
| 3,630,837 | A |   | 12/1971 | Freuler          |
| 3,660,338 | A |   | 5/1972  | Economou         |
| 3,686,151 | A |   | 8/1972  | Keim             |
| 3,700,623 | A |   | 10/1972 | Keim             |
| 3,772,076 | A |   | 11/1973 | Keim             |
| 3,821,068 | A |   | 6/1974  | Shaw             |
| 3,833,531 | A | * | 9/1974  | Keim ........................... 524/458 |
| 3,844,880 | A |   | 10/1974 | Meisel, Jr. et al. |
| 3,879,257 | A |   | 4/1975  | Gentile et al.   |
| 3,903,342 | A |   | 9/1975  | Roberts          |
| 3,926,716 | A |   | 12/1975 | Bates            |
| 3,949,014 | A |   | 4/1976  | Maki et al.      |
| 3,994,771 | A |   | 11/1976 | Morgan et al.    |
| 4,000,237 | A |   | 12/1976 | Roberts          |
| 4,072,557 | A |   | 2/1978  | Schiel           |
| 4,090,385 | A |   | 5/1978  | Packard          |
| 4,125,659 | A |   | 11/1978 | Klowak et al.    |
| 4,132,695 | A |   | 1/1979  | Burkholder       |
| 4,144,122 | A |   | 3/1979  | Emanuelsson et al. |
| 4,152,507 | A | * | 5/1979  | Yamamoto .................... 526/273 |
| 4,158,594 | A |   | 6/1979  | Becker et al.    |
| 4,208,459 | A |   | 6/1980  | Becker et al.    |
| 4,326,000 | A |   | 4/1982  | Roberts          |
| 4,351,699 | A |   | 9/1982  | Osborn           |
| 4,440,597 | A |   | 4/1984  | Wells et al.     |
| 4,442,833 | A |   | 4/1984  | Dahlen et al.    |
| 4,483,332 | A |   | 11/1984 | Rind             |
| 4,507,173 | A |   | 3/1985  | Klowak et al.    |
| 4,528,239 | A |   | 7/1985  | Trokhan          |
| 4,529,480 | A |   | 7/1985  | Trokhan          |
| 4,529,489 | A |   | 7/1985  | McDonald et al.  |
| 4,610,743 | A |   | 9/1986  | Salmeen et al.   |
| 4,637,859 | A |   | 1/1987  | Trokhan          |
| 4,710,374 | A |   | 12/1987 | Grollier et al.  |
| 4,785,030 | A |   | 11/1988 | Noda et al.      |
| 4,822,453 | A |   | 4/1989  | Dean et al.      |
| 4,859,527 | A |   | 8/1989  | Distefano        |
| 4,891,249 | A |   | 1/1990  | McIntyre         |
| 4,919,877 | A |   | 4/1990  | Parsons et al.   |
| 4,944,960 | A |   | 7/1990  | Sundholm et al.  |
| 4,949,668 | A |   | 8/1990  | Heindel et al.   |
| 4,996,091 | A |   | 2/1991  | McIntyre         |

(Continued)

FOREIGN PATENT DOCUMENTS

| DE | 34 41 883 A1 | 5/1986 |
|----|--------------|--------|
| DE | 43 05 727 A1 | 9/1994 |

(Continued)

OTHER PUBLICATIONS

US 5,494,564, 2/1996, Edwards et al. (withdrawn).
American Society for Testing Materials (ASTM) Designation: D1544-98, "Standard Test Method for Color of Transparent Liquids (Gardner Color Scale)," pp. 1-2, published Sep. 1998.
American Society for Testing Materials (ASTM) Designation: D5170-98, "Standard Test Method for Peel Strength ("T" Method) of Hook and Loop Touch Fasteners," pp. 702-704, published Mar. 1999.
TAPPI Official Test Method T 402 om-93, "Standard Conditioning and Testing Atmospheres for Paper, Board, Pulp Handsheets, and Related Products," published by the TAPPI Press, Atlanta, Georgia, revised 1993, pp. 1-3.
TAPPI Official Test Method T 411 om-89, "Thickness (Caliper) of Paper, Paperboard, and Combined Board," published by the TAPPI Press, Atlanta, Georgia, revised 1989, pp. 1-3.

(Continued)

*Primary Examiner* — Mark Eashoo
*Assistant Examiner* — Megan McCulley
(74) *Attorney, Agent, or Firm* — Michael J. Sullivan

(57) ABSTRACT

Topically-applied binder materials for imparting wet strength to soft, absorbent paper sheets, such as are useful as household paper towels and the like, include an epoxy-reactive polymer, such as a carboxyl-functional polymer, and an epoxy-functional polymer. These binder materials can be cured at ambient temperature over a period of days and do not impart objectionable odor to final product when wetted.

12 Claims, 14 Drawing Sheets
(6 of 14 Drawing Sheet(s) Filed in Color)

U.S. PATENT DOCUMENTS

| | | |
|---|---|---|
| 5,124,188 A | 6/1992 | Roe et al. |
| 5,129,988 A | 7/1992 | Farrington |
| 5,143,776 A | 9/1992 | Givens |
| 5,175,197 A | 12/1992 | Gestner et al. |
| 5,196,470 A | 3/1993 | Anderson et al. |
| 5,200,036 A | 4/1993 | Noda |
| 5,213,588 A | 5/1993 | Wong et al. |
| 5,225,460 A | 7/1993 | Sampath et al. |
| 5,264,468 A | 11/1993 | Miyahara |
| 5,312,863 A | 5/1994 | Van Rheenen et al. |
| 5,324,561 A | 6/1994 | Rezai et al. |
| 5,342,875 A | 8/1994 | Noda |
| 5,366,785 A | 11/1994 | Sawdai |
| 5,399,412 A | 3/1995 | Sudall et al. |
| 5,429,686 A | 7/1995 | Chiu et al. |
| 5,484,825 A | 1/1996 | Dick et al. |
| 5,525,664 A | 6/1996 | Miller et al. |
| 5,529,664 A | 6/1996 | Trokhan et al. |
| 5,529,665 A | 6/1996 | Kaun |
| 5,547,710 A | 8/1996 | Satgurunathan et al. |
| 5,556,509 A | 9/1996 | Trokhan et al. |
| 5,593,545 A | 1/1997 | Rugowski et al. |
| 5,607,551 A | 3/1997 | Farrington et al. |
| 5,610,215 A | 3/1997 | Nonweiler et al. |
| 5,614,597 A | 3/1997 | Bower |
| 5,637,194 A | 6/1997 | Ampulski et al. |
| 5,656,132 A | 8/1997 | Farrington et al. |
| 5,667,636 A | 9/1997 | Engel et al. |
| 5,672,248 A | 9/1997 | Wendt et al. |
| 5,674,590 A | 10/1997 | Anderson et al. |
| 5,709,775 A | 1/1998 | Trokhan et al. |
| 5,716,603 A | 2/1998 | Chen et al. |
| 5,776,312 A | 7/1998 | Trokhan et al. |
| 5,804,036 A | 9/1998 | Phan et al. |
| 5,820,730 A | 10/1998 | Phan et al. |
| 5,830,321 A | 11/1998 | Lindsay et al. |
| 5,840,403 A | 11/1998 | Trokhan et al. |
| 5,846,379 A | 12/1998 | Ampulski et al. |
| 5,855,739 A | 1/1999 | Ampulski et al. |
| 5,872,181 A | 2/1999 | Daniels et al. |
| 5,877,239 A | 3/1999 | Craun et al. |
| 5,893,965 A | 4/1999 | Trokhan et al. |
| 5,897,745 A | 4/1999 | Ampulski et al. |
| 5,904,811 A | 5/1999 | Ampulski et al. |
| 5,906,710 A | 5/1999 | Trokhan |
| 5,908,889 A | 6/1999 | Bailey et al. |
| 5,919,556 A | 7/1999 | Barnholtz |
| 5,935,381 A | 8/1999 | Trokhan et al. |
| 5,989,682 A | 11/1999 | Anderson |
| 5,990,377 A | 11/1999 | Chen et al. |
| 6,017,417 A | 1/2000 | Wendt et al. |
| 6,039,839 A | 3/2000 | Trokhan et al. |
| 6,054,020 A | 4/2000 | Goulet et al. |
| 6,059,928 A | 5/2000 | Van Luu et al. |
| 6,063,449 A | 5/2000 | Koskinen et al. |
| 6,083,346 A | 7/2000 | Hermans et al. |
| 6,096,152 A | 8/2000 | Anderson et al. |
| 6,096,169 A | 8/2000 | Hermans et al. |
| 6,103,062 A | 8/2000 | Ampulski et al. |
| 6,103,861 A | 8/2000 | Staib et al. |
| 6,117,270 A | 9/2000 | Trokhan |
| 6,117,492 A | 9/2000 | Goldstein et al. |
| 6,120,642 A | 9/2000 | Lindsay et al. |
| 6,126,784 A | 10/2000 | Ficke et al. |
| 6,129,815 A | 10/2000 | Larson et al. |
| 6,136,146 A | 10/2000 | Phan et al. |
| 6,140,419 A | 10/2000 | Chory et al. |
| 6,143,135 A | 11/2000 | Hada et al. |
| 6,187,137 B1 | 2/2001 | Druecke et al. |
| 6,187,139 B1 | 2/2001 | Edwards et al. |
| 6,187,140 B1 | 2/2001 | Anderson et al. |
| 6,193,847 B1 | 2/2001 | Trokhan |
| 6,197,154 B1 | 3/2001 | Chen et al. |
| 6,197,880 B1 | 3/2001 | Nigam |
| 6,200,418 B1 | 3/2001 | Oriaran et al. |
| 6,200,419 B1 | 3/2001 | Phan |
| 6,228,216 B1 | 5/2001 | Lindsay et al. |
| 6,303,672 B1 | 10/2001 | Papalos et al. |
| 6,309,527 B1 | 10/2001 | Broekhuis et al. |
| 6,319,312 B1 | 11/2001 | Luongo |
| 6,387,989 B1 | 5/2002 | Sulzbach et al. |
| 6,395,957 B1 | 5/2002 | Chen et al. |
| 6,410,617 B1 | 6/2002 | Sulzbach et al. |
| 6,420,013 B1 | 7/2002 | Vinson et al. |
| 6,423,180 B1 | 7/2002 | Behnke et al. |
| 6,426,121 B1 | 7/2002 | Goldstein et al. |
| 6,462,159 B1 | 10/2002 | Hamada et al. |
| 6,464,831 B1 | 10/2002 | Trokhan et al. |
| 6,465,556 B1 | 10/2002 | Pratt et al. |
| 6,500,289 B2 | 12/2002 | Merker et al. |
| 6,506,696 B2 | 1/2003 | Goldstein et al. |
| 6,506,821 B1 | 1/2003 | Huver et al. |
| 6,533,978 B1 | 3/2003 | Wisneski et al. |
| 6,534,177 B2 | 3/2003 | Kohlhammer et al. |
| 6,576,091 B1 | 6/2003 | Cabell et al. |
| 6,586,520 B1 | 7/2003 | Canorro et al. |
| 6,607,630 B2 | 8/2003 | Bartman et al. |
| 6,608,237 B1 | 8/2003 | Li et al. |
| 6,610,173 B1 | 8/2003 | Lindsay et al. |
| 6,660,362 B1 | 12/2003 | Lindsay et al. |
| 6,727,004 B2 | 4/2004 | Goulet et al. |
| 6,936,316 B2 | 8/2005 | Nigam et al. |
| 2001/0005529 A1 | 6/2001 | Owens et al. |
| 2001/0024644 A1* | 9/2001 | Kohlhammer et al. .... 424/78.19 |
| 2002/0107495 A1 | 8/2002 | Chen et al. |
| 2003/0059636 A1 | 3/2003 | Nigam |
| 2003/0079847 A1 | 5/2003 | Howle et al. |
| 2003/0112311 A1 | 6/2003 | Naik et al. |
| 2003/0121627 A1 | 7/2003 | Hu et al. |
| 2003/0199629 A1 | 10/2003 | Gelman et al. |
| 2004/0007339 A1 | 1/2004 | Tirimacco |
| 2004/0031578 A1 | 2/2004 | Tirimacco |
| 2004/0099388 A1 | 5/2004 | Chen et al. |
| 2004/0114012 A1 | 6/2004 | Chu et al. |
| 2004/0118544 A1 | 6/2004 | Tirimacco et al. |
| 2004/0123963 A1 | 7/2004 | Chen et al. |
| 2004/0192136 A1 | 9/2004 | Gusky et al. |
| 2005/0004309 A1 | 1/2005 | Gerst et al. |
| 2005/0045292 A1 | 3/2005 | Lindsay et al. |
| 2005/0045293 A1 | 3/2005 | Hermans et al. |
| 2005/0045294 A1 | 3/2005 | Goulet et al. |
| 2005/0045295 A1 | 3/2005 | Goulet et al. |
| 2005/0247417 A1 | 11/2005 | Tirimacco |
| 2006/0014884 A1 | 1/2006 | Goulet et al. |
| 2006/0124261 A1 | 6/2006 | Lindsay et al. |
| 2007/0010153 A1 | 1/2007 | Shaffer et al. |
| 2007/0051484 A1 | 3/2007 | Hermans et al. |
| 2007/0102127 A1 | 5/2007 | Hermans et al. |
| 2008/0035288 A1 | 2/2008 | Mullally et al. |

FOREIGN PATENT DOCUMENTS

| | | |
|---|---|---|
| EP | 0 135 231 A1 | 3/1985 |
| EP | 0 140 404 A1 | 5/1985 |
| EP | 0 618 005 A2 | 10/1994 |
| EP | 0 662 542 A1 | 7/1995 |
| EP | 0 549 925 B1 | 8/1995 |
| EP | 0 694 578 A2 | 1/1996 |
| EP | 0 661 030 B1 | 7/2000 |
| EP | 1 180 559 A1 | 2/2002 |
| EP | 1 082 391 B1 | 6/2002 |
| EP | 1 316 432 A1 | 6/2003 |
| GB | 2 006 296 A | 5/1979 |
| GB | 2 303 647 A | 2/1997 |
| WO | WO 92/16681 A1 | 10/1992 |
| WO | WO 93/10732 A1 | 6/1993 |
| WO | WO 97/44528 A1 | 11/1997 |
| WO | WO 97/47227 A1 | 12/1997 |
| WO | WO 98/37274 A1 | 8/1998 |
| WO | WO 98/55695 A1 | 12/1998 |
| WO | WO 99/10597 A1 | 3/1999 |
| WO | WO 99/34057 A1 | 7/1999 |
| WO | WO 99/34060 A1 | 7/1999 |
| WO | WO 00/08077 A1 | 2/2000 |
| WO | WO 00/66835 A1 | 11/2000 |
| WO | WO 01/02644 A1 | 1/2001 |
| WO | WO 02/29154 A2 | 4/2002 |
| WO | WO 02/41815 A2 | 5/2002 |

| WO | WO 02/100032 A1 | 12/2002 |
| WO | WO 2004/005039 A1 | 1/2004 |
| WO | WO 2004/009905 A1 | 1/2004 |
| WO | WO 2004/037935 A1 | 5/2004 |

OTHER PUBLICATIONS

"Airflex 426 Emulsion," Air Products Polymers, L.P., 2-page brochure and Internet web page"http://airproducts.com/polymers/controlled/product_description.asp?intRegionalMarketSegment=55 . . . " printed Jul. 1, 2003, 2 pages and 1 page Specifications.

Bhangale, Sunil M., "Epoxy Resins," Internet web page "http://sunilbhangale.tripod.com/epoxy.html", viewed and printed Jul. 29, 2003, pp. 1-4.

Blank, Werner J. et al., "Catalysis of the Epoxy-Carboxyl Reaction," *International Waterborne, High-Solids and Powder Coatings Symposium,* New Orleans, LA, Feb. 21-23, 2001, sponsored by the University of Southern Mississippi, Paper23_jct1.doc, printed Aug. 8, 2001, 18 pages.

Carey, Francise A., "Reactions of Epoxides," *Organic Chemistry 4e Carey Online Learning Center,* Chapter 16: Ethers, Epoxides and Sulfides, McGraw Hill, 2000, Internet web page, "http://www.mhhe.com/physsci/chemistry/carey/student/olc/ch16reactionsepoxides.html", viewed and printed Jul. 29, 2003, pp. 1-4.

Day, Dr. Richard, "Epoxy Resins," Internet web page, "http://www2.umist.ac.uk/material/teaching/year2/ml260/epoxy.doc", Feb. 26, 1998, viewed and printed Jul. 29, 2003, 10 pages.

DeVry, William E., "Latex Bonding Chemistry and Processes," *Nonwovens An Advanced Tutorial,* edited by Albin F. Turbak and Tyrone L. Vigo, TAPPI Press, Atlanta, GA, 1989, Chapter 5, pp. 51-69.

Donnelly, R.H. and Martti Kangas, "Dryad Technology—Implementing Spraying Technology in Paper and Board Manufacturing," *Paperi ja Puu—Paper and Timber,* vol. 83, No. 7, 2001, pp. 530-531.

Espy, Herbert H., "Alkaline-Curing Polymeric Amine-Epichlorohydrin Resins," *Wet-Strength Resins and Their Application,* edited by Lock L. Chan, Chapter 2, TAPPI Press, Atlanta, GA, 1994, pp. 14-44.

"Glycidylic Ethers," KEMI, National Chemicals Inspectorate, Sweden, Internet web page "http://www.kemi.se/kemamne_eng/glycidetrar_eng.htm", viewed and printed Jul. 29, 2003, pp. 1-2.

Moyer, W.W. Jr. and R.A. Stagg, "Miscellaneous Wet-Strength Agents," *Wet Strength in Paper and Paperboard,* TAPPI Monograph Series No. 29, Technical Association of the Pulp and Paper Industry, Mack Printing Company, Easton, PA, Chapter 8, 1965, pp. 105-125.

Oinonen, Hannu, "Metso Introduces New Coating Method: Spray for Light-Weight Coating," *Paperi ja Puu—Paper and Timber,* vol. 83, No. 7, 2001, pp. 526-528.

Sabia, A.J. and R.B. Metzler, "The Role of Silicones In Woven and Nonwoven Fabric Applications," *Advances in Nonwoven Technology—Tenth Technical Symposium,* Inda, Association of the Nonwoven Fabrics Industry, New York, Nov. 17-19, 1982, pp. 284-293.

Zhao, Yaqiu and Marek W. Urban, "Novel STY/nBA/GMA and STY/nBA/MAA Core—Shell Latex Blends: Film Formation, Particle Morphology, and Cross-Linking. 20. A Spectroscopic Study," *Macromolecules,* vol. 33, No. 22, 2000, pp. 8426-8434.

Smook, Gary A., Editor, "Manufacturing Techniques for Specific Paper and Board Grades," Handbook for Pulp & Paper Technologists, Second Edition, Angus Wilde Publications, Bellingham, WA, 1992, pp. 318-319.

* cited by examiner

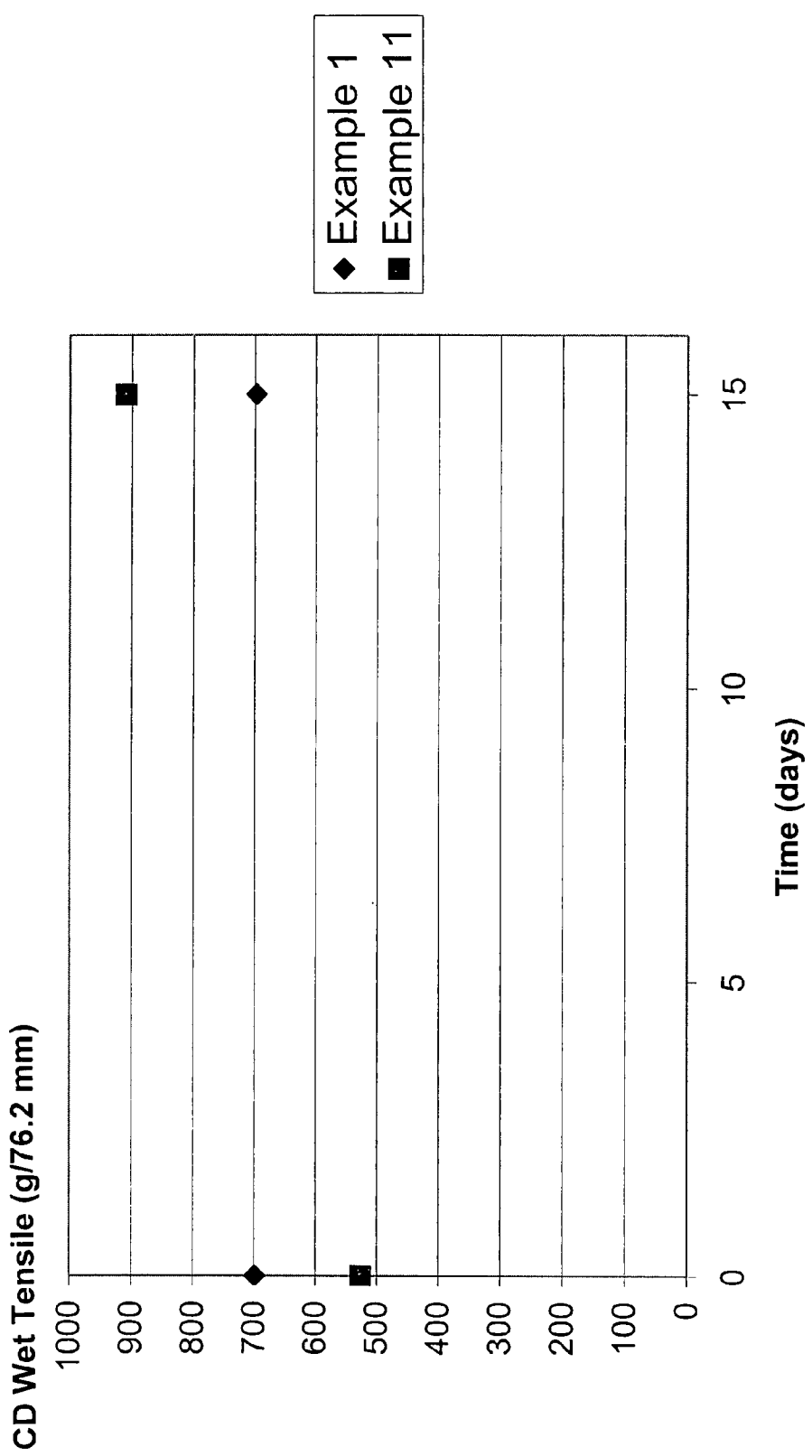

LOW ODOR BINDERS CURABLE AT ROOM TEMPERATURE

This application is a divisional of U.S. patent application Ser. No. 10/893,209 filed Jul. 15, 2004, now U.S. Pat. No. 7,229,529, which is a continuation-in-part of U.S. patent application Ser. No. 10/654,556 filed Sep. 2, 2003, now U.S. Pat. No. 7,189,307.

BACKGROUND OF THE INVENTION

In the manufacture of certain bonded non-woven products, the use of topical binders to impart added strength to the final product is well known. An example of such a process is disclosed in U.S. Pat. No. 3,879,257 entitled "Absorbent Unitary Laminate-Like Fibrous Webs and Method for Producing Them" and issued Apr. 22, 1975 to Gentile et al., herein incorporated by reference. A problem associated with commercially available topical binders is that they require a highly elevated curing temperature to impart the desired strength, which in turn requires a curing oven or equivalent apparatus. These requirements add to the capital and manufacturing costs associated with the product. Also, some commercially available binders can emit hazardous air pollutants, such as formaldehyde, and the resulting product can exhibit an undesirable odor, particularly when wetted.

Therefore there is a need for a binder system that provides sufficient strength to the product, yet does not require high temperatures and associated equipment for curing, does not emit formaldehyde during crosslinking and does not produce an objectionable odor when the resulting paper product is wetted.

SUMMARY OF THE INVENTION

It now has been discovered that binder systems involving the reaction between an epoxy-reactive polymer and an epoxy-functional polymer, when topically applied to a fibrous web such as a paper towel basesheet, can cure at ambient or low temperature without emitting formaldehyde and without imparting objectionable odors to the resulting product. The low odor associated with the products of this invention is due to the absence of known odor causing species, or alternatively, the presence of known odor-causing species in low levels, near or below the human nose detection threshold. Odor-causing species sometimes associated with bonded nonwoven products include amines, methylamines, dimethylamines, trimethylamines, organic acids, aldehydes and malodorous cellulose-degradation products which can occur when a high temperature cure process is required. The level of odor is usually increased when the product is wetted with water or other fluids, particularly fluids having a pH above 7.

Without being bound by theory, it is hypothesized that during curing, the epoxy groups of the epoxy-functional polymer react with the epoxy-reactive groups of the epoxy-reactive polymer to form various linkages, such as ester linkages when the epoxy-reactive groups are carboxyl groups, thereby cross-linking the epoxy-reactive polymers together to form a durable bonded structure with wet tensile strength permanence. The wet tensile strength is evident even at the high pH associated with window cleaners, which is an important property for household towels. At the same time, the epoxy groups of the epoxy-functional polymer can also react with the carboxyl groups on the surface of the cellulose fibers within the web to further strengthen the resulting structure. Other reactions may also be taking place between the epoxy-functional polymer, the epoxy-reactive polymer and the fibers of the web substrate.

Surprisingly, it has been observed that curing of the binder system at ambient temperature takes place over several days so that the wet strength of the resulting product substantially increases with time. To the extent prior artisans have experimented with similar systems, they may not have appreciated the prolonged curing reaction and may have assumed that the resulting strength properties imparted to the web were insufficient. Although attainment of the ultimate wet strength can be accelerated by high curing temperatures, high curing temperatures have been found to be unnecessary and disadvantageous as previously mentioned.

Hence, in one aspect the invention resides in an aqueous binder composition comprising an unreacted mixture of an epoxy-reactive polymer and an epoxy-functional polymer, wherein the amount of the epoxy-functional polymer relative to the amount of epoxy-reactive polymer can be from about 0.5 to about 25 weight percent on a solids basis.

In another aspect, the invention resides in a method of increasing the strength of a fibrous web comprising topically applying an aqueous binder composition to one or both outer surfaces of the web, wherein the binder composition comprises an unreacted mixture of an epoxy-reactive polymer and an epoxy-functional polymer.

In another aspect, the invention resides in a fibrous web or sheet having first and second outer surfaces, wherein at least one outer surface comprises a topically-applied network of a cured binder composition resulting from the cross-linking reaction of an epoxy-reactive polymer and an epoxy-functional polymer. As used herein, the term "network" is used to describe any binder pattern that serves to bond the sheet together. The pattern can be regular or irregular and can be continuous or discontinuous.

Products incorporating the fibrous webs of this invention can be single-ply or multi-ply (two, three, or more plies). The binder composition can be applied to one or more surfaces of the ply or plies within the product. For example, a single-ply product can have one or both surfaces treated with the binder composition. A two-ply product can have one or both outer surfaces treated with the binder composition and/or one or both inner surfaces treated with the binder composition. In the case of a two-ply product, it can be advantageous to have one or both binder-treated surfaces plied inwardly in order to expose the untreated surface(s) of the plies on the outside of the product for purposes of hand-feel or absorbency. When the binder is applied to the inner surfaces of a multi-ply product, the binder also provides a means of bonding the plies together. In such cases, mechanical bonding may not be required. In the case of a three-ply product, the same options are available. In addition, for example, it may be desirable to provide a center ply which is not treated with binder while the two outer plies are treated with binder as described above.

As used herein, a "polymer" is a macromolecule consisting of at least five monomer units. More particularly, the degree of polymerization, which is the number of monomer units in an average polymer unit for a given sample, can be about 10 or greater, more specifically about 30 or greater, more specifically about 50 or greater and still more specifically from about 10 to about 10,000.

Epoxy-reactive polymers suitable for use in accordance with this invention are those polymers containing functional pendant groups that will react with epoxy-functional molecules. Such reactive functional groups include carboxyl groups, anhydrides, amines, polyamides, phenolic resins, isocyanates, polymercaptans, alcohols, and others. Particularly suitable epoxy-reactive polymers include carboxyl-functional latex emulsion polymers. More particularly, carboxyl-functional latex emulsion polymers useful in accordance with this invention can comprise aqueous emulsion addition copolymerized unsaturated monomers, such as ethylenic monomers, polymerized in the presence of surfactants and initiators to produce emulsion-polymerized polymer particles. Unsaturated monomers contain carbon-to-carbon double bond unsaturation and generally include vinyl monomers, styrenic monomers, acrylic monomers, allylic monomers, acrylamide monomers, as well as carboxyl functional monomers. Vinyl monomers include vinyl esters such as vinyl acetate, vinyl propionate and similar vinyl lower alkyl esters, vinyl halides, vinyl aromatic hydrocarbons such as styrene and substituted styrenes, vinyl aliphatic monomers such as alpha olefins and conjugated dienes, and vinyl alkyl ethers such as methyl vinyl ether and similar vinyl lower alkyl ethers. Acrylic monomers include lower alkyl esters of acrylic or methacrylic acid having an alkyl ester chain from one to twelve carbon atoms as well as aromatic derivatives of acrylic and methacrylic acid. Useful acrylic monomers include, for instance, methyl, ethyl, butyl, and propyl acrylates and methacrylates, 2-ethyl hexyl acrylate and methacrylate, cyclohexyl, decyl, and isodecyl acrylates and methacrylates, and similar various acrylates and methacrylates.

In accordance with this invention, the carboxyl-functional latex emulsion polymer can contain copolymerized carboxyl-functional monomers such as acrylic and methacrylic acids, fumaric or maleic or similar unsaturated dicarboxylic acids, where the preferred carboxyl monomers are acrylic and methacrylic acid. The carboxyl-functional latex polymers comprise by weight from about 1% to about 50% copolymerized carboxyl monomers with the balance being other copolymerized ethylenic monomers. Preferred carboxyl-functional polymers include carboxylated vinyl acetate-ethylene terpolymer emulsions such as Airflex® 426 Emulsion, commercially available from Air Products Polymers, LP.

Suitable epoxy-functional polymers include water soluble, poly-functional epoxy resins. Water soluble, poly-functional epoxy resins include, but are not limited to, polymeric amine-epichlorohydrin condensation products of the type commonly used as alkaline-curing wet strength resins for paper products. Many of these resins are described in the text "Wet Strength Resins and Their Applications", chapter 2, pages 14-44, TAPPI Press (1994), herein incorporated by reference. Other types of epoxy-functional polymers are also useful, including epoxy-modified organoreactive silicones, glycidyl epoxy resins including glycidyl-ether, glycidyl-ester and glycidyl amine resins, as well as aliphatic or cycloaliphatic non-glycidyl epoxy resins.

The epoxy-functional polymers commonly used as alkaline-curing wet strength resins are made by reacting a polyamine or an amine-containing polymer with an epoxide possessing a second functional group (typically an epihalohydrin such as epichlorohydrin, epibromohydrin, epifluorohydrin or epiiodohydrin, most preferably epichlorohydrin) in water solution. The epihalorohydrin alkylates and cross-links the polyamine to a moderate molecular weight. The cross-linking reaction is then arrested by dilution, and/or by reducing the pH to convert amine groups to their acid salts. The resulting polymer contains multiple functional groups that can partake in cross-linking reactions and also possesses cationic charge in water, which helps render the molecule water soluble and thus able to be easily formulated into an aqueous emulsion or dispersion which contains polymers with epoxy-reactive functional groups.

When selecting an epoxy-functional polymer it is advantageous to use a multi-functional reactant possessing 4 or more pendant epoxy moieties per molecule in order to provide sufficient cross-linking. More specifically, the number of pendant epoxy moieties per molecule can be about 10 or more, more specifically about 50 or more, more specifically about 100 or more, more specifically from about 10 to about 2000, more specifically from about 10 to about 1000, and still more specifically from about 25 to about 1000. Particularly suitable epoxy-functional polymers include quaternary ammonium epoxide polymers, such as poly(methyldiallylamine)-epichlorohydrin resin commercially available as Kymene® 2064, from Hercules Inc.

In the case of a quaternary ammonium epoxide polymer as mentioned above, the epoxide groups can be converted to chlorohydrins by reaction with hydrochloric acid. The less reactive chlorohydrin form of the polymer facilitates storage of the concentrated polymer, which can be held at a pH of about 4-5, for example. Prior to use, the chlorohydrin groups can be reconverted to epoxide groups by a reaction with alkali. The alkali conversion of chlorohydrin groups to epoxide groups for a poly(methyldiallylamine)-epichlorohydrin resin is shown below.

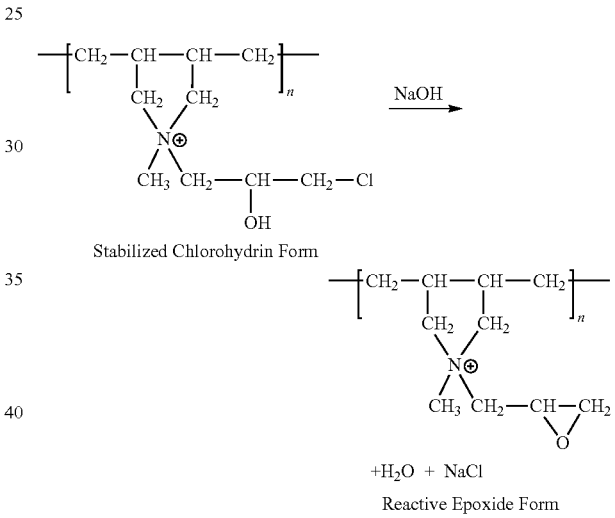

Stabilized Chlorohydrin Form

Reactive Epoxide Form

The rate of reaction increases with increasing pH. For maximum efficiency, a stoichiometric amount of alkali is needed to convert all of the chlorohydrin groups to epoxide. However, an excess of alkali can accelerate hydrolysis of the epoxide groups. The reactivation is usually performed in dilute solution to avoid premature gelation, and good stirring is essential to avoid locally excessive concentrations and consequent gel formation.

The relative amounts of the epoxy-reactive polymer and the epoxy-functional polymer will depend on the number of functional groups (degree of functional group substitution on molecule) present on each component. In general, it has been found that properties desirable for a disposable paper towel, for example, are achieved when the level of epoxy-reactive polymer exceeds that of the epoxy-functional polymer on a dry solids basis. More specifically, on a solids basis, the amount of epoxy-functional polymer relative to the amount of epoxy-reactive polymer can be from about 0.5 to about 25 weight percent, more specifically from about 1 to about 20 weight percent, still more specifically from about 2 to about 10 weight percent and still more specifically from about 5 to about 10 weight percent. For epoxy-reactive polymers besides carboxyl-functional polymers, similar ranges for the weight ratios of epoxy-functional polymer to epoxy-reactive polymer would apply.

The binder compositions of this invention can optionally contain one or more additives that have been found to reduce "blocking" when the sheet is wound into a roll without interfering with, and often enhancing strength, absorbency or other properties. Blocking is often a problem for wound sheets that have been treated with topical binders, such as paper toweling, because the binder on the sheet surface can interact with the surface of an adjacent sheet, especially while in a roll format, to bond the two surfaces together, resulting in blocking. Upon unwinding of the paper roll, the presence of blocking causes the sheets to stick together and can tear or delaminate the sheet surface, causing defects and an unusable product. Suitable anti-blocking additives include: 1) chemically reactive additives, such as multifunctional aldehydes, including glyoxal, glutaraldehyde and glyoxalated polyacrylamides designed to increase the level of crosslinking of the latex polymer immediately after drying the web; 2) non-reactive additives, such as silicones, waxes, oils, designed to modify the surface chemistry of at least one outer surface of the web to reduce blocking; and 3) soluble or insoluble crystals, such as sugars, talc, clay and the like, designed to reside on the surface of the binder film and thus reduce its propensity to cause blocking to an adjacent web surface. The amount of the anti-blocking additive in the binder composition, on a weight percent solids basis, can be from about 1 to about 25 percent, more specifically from about 5 to about 20 percent and more specifically from about 10 to about 15 percent.

The effectiveness of an anti-blocking additive can be measured in accordance with the Blocking Test (hereinafter described). Blocking Test values for fibrous sheets, particularly paper towels, in accordance with this invention can be about 23 grams (force) or less, more specifically about 20 grams (force) or less, more specifically about 15 grams (force) or less, more specifically from about 4 to about 23 grams (force) and still more specifically from about 4 to about 15 grams (force).

The surface area coverage of the binder composition on the fibrous web can be about 5 percent or greater, more specifically about 30 percent or greater, still more specifically from about 5 to about 90 percent, and still more specifically from about 20 to about 75 percent.

Curing temperatures for the binder composition can be about 260° C. or less, more specifically about 120° C. or less, more specifically about 100° C. or less, more specifically about 40° C. or less, more specifically from about 10 to about 260° C. and still more specifically from about 20 to about 120° C. It will be appreciated that although the binder compositions of this invention can be cured at relatively low temperatures, the rate of curing can be accelerated at higher temperatures associated with curing conventional binders. However, such higher cure temperatures are not necessary with the binder compositions of this invention.

Depending upon the curing temperature, the cross-machine direction wet/dry tensile strength ratio of the treated basesheets of this invention can increase about 30 percent or more, more specifically about 50 percent or more, more specifically about 70 percent or more, more specifically from about 30 to about 250 percent, more specifically from about 30 to about 150 percent, and still more specifically from about 40 to about 130 percent when naturally aged for 14 days.

As used herein, dry machine direction (MD) tensile strengths represent the peak load per sample width when a sample is pulled to rupture in the machine direction. In comparison, dry cross-machine direction (CD) tensile strengths represent the peak load per sample width when a sample is pulled to rupture in the cross-machine direction. Samples for tensile strength testing are prepared by cutting a 3 inches (76.2 mm) wide×5 inches (127 mm) long strip in either the machine direction (MD) or cross-machine direction (CD) orientation using a JDC Precision Sample Cutter (Thwing-Albert Instrument Company, Philadelphia, Pa., Model No. JDC 3-10, Serial No. 37333). The instrument used for measuring tensile strengths is an MTS Systems Sintech 11S, Serial No. 6233. The data acquisition software is MTS TestWorks® for Windows Ver. 3.10 (MTS Systems Corp., Research Triangle Park, N.C.). The load cell is selected from either a 50 Newton or 100 Newton maximum, depending on the strength of the sample being tested, such that the majority of peak load values fall between 10-90% of the load cell's full scale value. The gauge length between jaws is 4+/−0.04 inches (101.6+/−1 mm). The jaws are operated using pneumatic-action and are rubber coated. The minimum grip face width is 3 inches (76.2 mm), and the approximate height of a jaw is 0.5 inches (12.7 mm). The crosshead speed is 10+/−0.4 inches/min (254+/−1 mm/min), and the break sensitivity is set at 65%. The sample is placed in the jaws of the instrument, centered both vertically and horizontally. The test is then started and ends when the specimen breaks. The peak load is recorded as either the "MD dry tensile strength" or the "CD dry tensile strength" of the specimen depending on the sample being tested. At least six (6) representative specimens are tested for each product and the arithmetic average of all individual specimen tests is either the MD or CD tensile strength for the product.

Wet tensile strength measurements are measured in the same manner, but are only typically measured in the cross-machine direction of the sample. Prior to testing, the center portion of the CD sample strip is saturated with tap water immediately prior to loading the specimen into the tensile test equipment. CD wet tensile measurements can be made both immediately after the product is made and also after some time of natural aging of the product. For mimicking natural aging, experimental product samples are stored at ambient conditions of approximately 23° C. and 50% relative humidity for up to 15 days or more prior to testing so that the sample strength no longer increases with time. Following this natural aging step, the samples are individually wetted and tested. For measuring samples that have been made more than two weeks prior to testing, which are inherently naturally aged, such conditioning is not necessary.

Sample wetting is performed by first laying a single test strip onto a piece of blotter paper (Fiber Mark, Reliance Basis 120). A pad is then used to wet the sample strip prior to testing. The pad is a Scotch-Brite® brand (3M) general purpose commercial scrubbing pad. To prepare the pad for testing, a full-size pad is cut approximately 2.5 inches (63.5 mm) long by 4 inches (101.6 mm) wide. A piece of masking tape is wrapped around one of the 4 inch (101.6 mm) long edges. The taped side then becomes the "top" edge of the wetting pad. To wet a tensile strip, the tester holds the top edge of the pad and dips the bottom edge in approximately 0.25 inch (6.35 mm) of tap water located in a wetting pan. After the end of the pad has been saturated with water, the pad is then taken from the wetting pan and the excess water is removed from the pad by lightly tapping the wet edge three times on a wire mesh screen. The wet edge of the pad is then gently placed across the sample, parallel to the width of the sample, in the approximate center of the sample strip. The pad is held in place for approximately one second and then removed and placed back into the wetting pan. The wet sample is then immediately inserted into the tensile grips so the wetted area is approximately centered between the upper and lower grips. The test strip should be centered both horizontally and vertically between the grips. (It should be noted that if any of the wetted portion comes into contact with the grip faces, the specimen must be discarded and the jaws dried off before resuming testing.) The tensile test is then performed and the peak load recorded as the CD wet tensile strength of this specimen. As with the dry tensile tests, the characterization of a product is determined by the average of six representative sample measurements.

Similar to the CD wet tensile test described above, CD wet tensile may also be tested with an alternate testing fluid, particularly one having a higher pH such as Formula 409® All-Purpose Cleaner (Clorox Company), for example, which has a pH of about 12 (11.5). With this test two procedural changes occur. The first change is pouring out the tap water in the wetting pan and replacing it with 0.25 inches (6.35 mm) of the alternate testing fluid. The second change is to prepare a second Scotch-Brite brand (3M) general purpose commercial scrubbing pad as described above, where one pad is used for tap water and the other is used for the alternate testing fluid. The CD wet tensile test is then performed exactly as described above except using the alternate pad and the alternate testing fluid.

In addition to tensile strength, stretch, tensile energy absorbed (TEA), and slope are also reported by the MTS TestWorks® for Windows Ver. 3.10 program for each sample measured both dry and wet. Stretch is reported as a percentage and is defined as the ratio of the slack-corrected elongation of a specimen at the point it generates its peak load divided by the slack-corrected gage length. Tensile energy absorbed is reported in the units of grams-centimeters/centimeters squared (g-cm/cm$^2$) and is defined as the integral of the force produced by a specimen with its elongation up to the defined break point (65% drop in peak load) divided by the face area of the specimen. Slope is reported in the units of grams (g) and is defined as the gradient of the least-squares line fitted to the load-corrected strain points falling between a specimen-generated force of 70 to 157 grams (0.687 to 1.540 N) divided by the specimen width.

As used herein, "bulk" is calculated as the quotient of the caliper (hereinafter defined) of a product, expressed in microns, divided by the basis weight, expressed in grams per square meter. The resulting bulk of the product is expressed in cubic centimeters per gram. Caliper is measured as the total thickness of a stack of ten representative sheets of product and dividing the total thickness of the stack by ten, where each sheet within the stack is placed with the same side up. Caliper is measured in accordance with TAPPI test methods T402 "Standard Conditioning and Testing Atmosphere For Paper, Board, Pulp Handsheets and Related Products" and T411 om-89 "Thickness (caliper) of Paper, Paperboard, and Combined Board" with Note 3 for stacked sheets. The micrometer used for carrying out T411 om-89 is an Emveco 200-A Tissue Caliper Tester available from Emveco, Inc., Newberg, Oreg. The micrometer has a load of 2.00 kilo-Pascals (132 grams per square inch), a pressure foot area of 2500 square millimeters, a pressure foot diameter of 56.42 millimeters, a dwell time of 3 seconds and a lowering rate of 0.8 millimeters per second. After the caliper is measured, the top sheet of the stack of 10 is removed and the remaining sheets are used to determine the basis weight.

The products (single-ply or multi-ply) or sheets of this invention can have a bulk of about 11 cubic centimeters or greater per gram, more specifically about 12 cubic centimeters or greater per gram, more specifically about 13 cubic centimeters or greater per gram, more specifically from about 11 to about 20 cubic centimeters per gram, and still more specifically from about 12 to about 20 cubic centimeters per gram.

As used herein, the Blocking Test value is determined by ASTM D 5170-98—Standard Test Method for Peel Strength ("T" Method) of Hook and Loop Touch Fasteners, but with the following exceptions in order to adapt the method from hook and loop testing to tissue testing (modified ASTM section numbers are shown in parenthesis):

(a) Replace all references to "hook and loop touch fasteners" with "blocked tissue samples".

(b) (Section 3.3) Only one calculation method is used, namely the "integrator average" or average force over the measured distance.

(c) (Section 4.1) No roller device is used.

(d) (Section 6. Specimen Preparation) Replace all contents with the following:

The level of blocking that will occur naturally over prolonged aging under pressure in a wound roll can be simulated by conditioning the samples in an oven under pressure. To artificially block samples, the 2 sheet specimens to be blocked together are cut to 76.2±1 mm (3±0.04 inches) in the cross direction by 177.8±25.4 mm (7±1 inch) in the machine direction. The specimens are then placed on a flat surface in an oven operating at 66° C. On top of the specimens is placed a lightweight polycarbonate plate. On top of the polycarbonate plate, centered on the sample strips, is placed an iron block weighing approximately 11,800 g and having a bottom face area of 10.2 cm×10.2 cm. The samples are stored in the oven under the applied weight for 1 hour. When the samples are removed from the oven, they are allowed to equilibrate under no additional weight for at least 4 hours in standard TAPPI conditions (25° C. and 50% relative humidity) prior to conducting the blocking test.

(e) (Section 8. Procedure) Replace all contents with the following:

"Separate the top and bottom sheet of the specimen along the CD (3 inch) edge. Peel back approximately 51 mm (2 inches) of the top and bottom sheets in the machine direction. Position the clamps of the tensile tester so they are 25.4±1 mm (1±0.04 inches) apart. Place the free ends of the specimen to be tested in the clamps of the tensile tester, with the specimen tail facing away from the frame. The point of specimen separation should be approximately centered between the clamps and aligned approximately parallel to the clamps. For the integrator calculation, set up the software to begin averaging after 25.4 mm (1 inch) of separation and end averaging after 88.9 mm (3.5 inches) of separation. The software should be set up to separate the sample over a total of 101.6 mm (4 inches)."

(f) (Section 9. Calculation) Omit all but 9.2.

(g) (Section 10. Report) Replace all contents with the following:

"Report the integrator average for each specimen."

(h) (Section 11.1) Replace all contents with the following:

"At least 5 specimens should be tested for a reliable sample average."

BRIEF DESCRIPTION OF THE DRAWINGS

The file of this patent contains at least one photograph executed in color. Copies of this patent with color photograph(s) will be provided by the Office upon request and payment of the necessary fee.

FIG. 10 is plot of the CD wet strength as a function of time for paper towel basesheets made in accordance with Examples 1 and 11, illustrating the improvement in wet strength using the binder material of this invention in the presence of glyoxal.

DETAILED DESCRIPTION OF THE DRAWINGS

Figure 1:
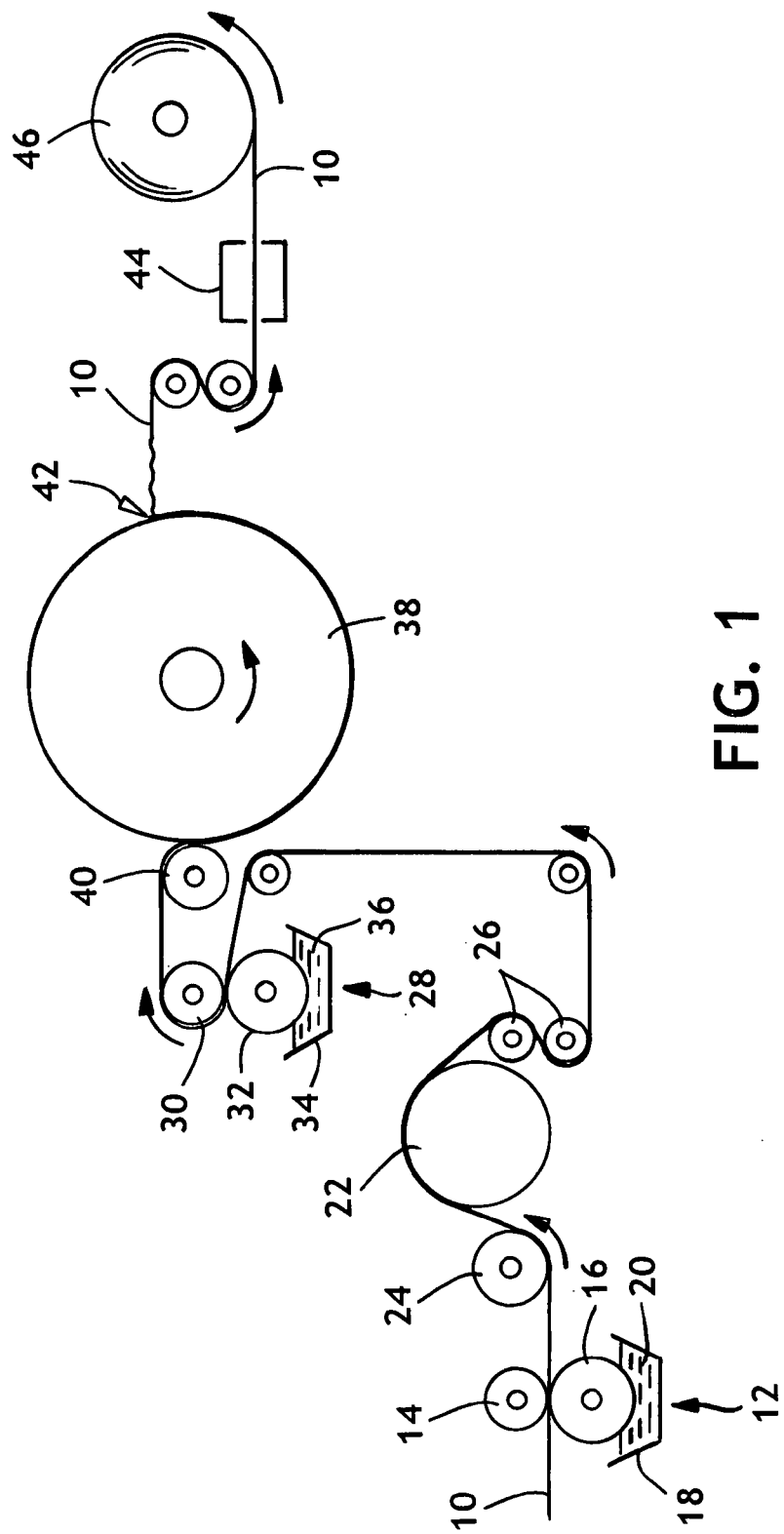
FIG. 1 is a schematic flow diagram of a process for topically applying a binder or binders to a paper web in accordance with this invention.
Figure 2A:
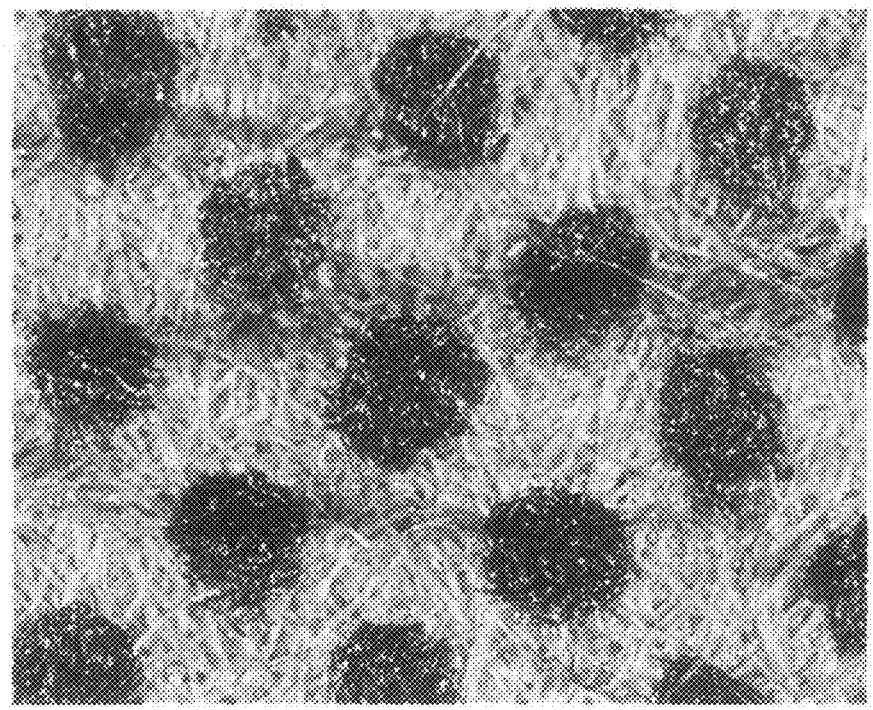
FIG. 2A is a magnified color photograph of a surface of a stained wet laid paper towel basesheet, made in accordance with Example 10 herein, onto which the binder material has been printed in accordance with this invention, illustrating the pattern of the spaced-apart binder deposits on this side of the sheet. The actual area of the sheet shown in the photograph (and also in the photographs of FIGS. 2B, 3A and 3B) is an area measuring about 3.43 millimeters by about 2.74 millimeters.
Figure 2B:
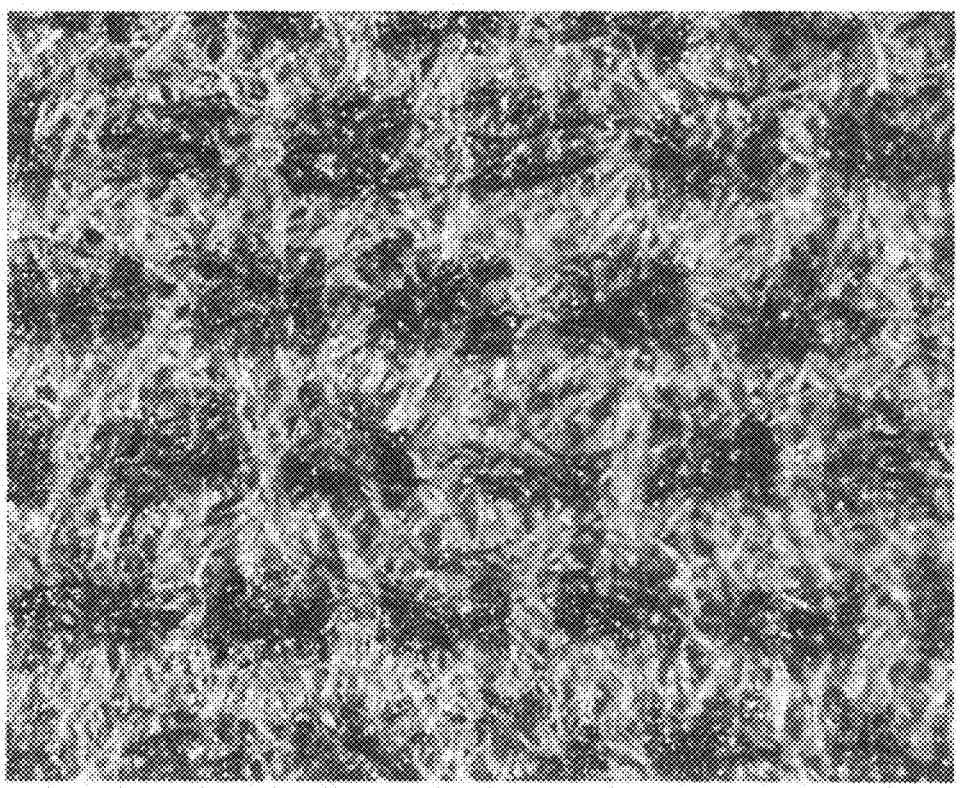
FIG. 2B is a color photograph of the opposite side of the paper towel basesheet of FIG. 2A, illustrating the pattern of spaced-apart binder deposits on this side of the sheet.
Figure 2C:
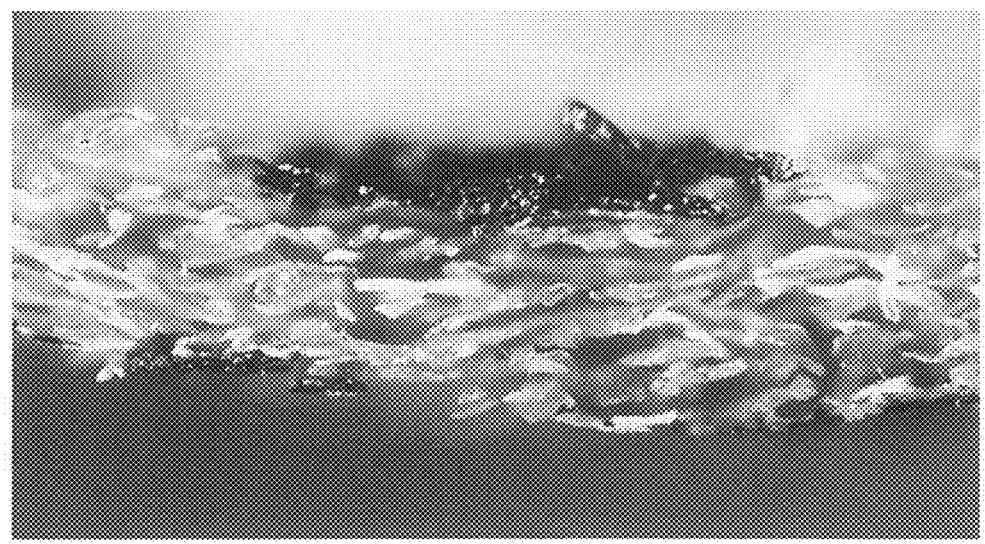
FIG. 2C is a color cross-sectional photograph of the paper towel basesheet of FIG. 2A, further illustrating the nature of the deposits. Although not shown, some of the deposits extend deeper into the sheet as a result of periodic "deep dot" gravure cells that deposit more binder material onto the surface of the sheet than most of the other gravure cells.
Figure 3A:
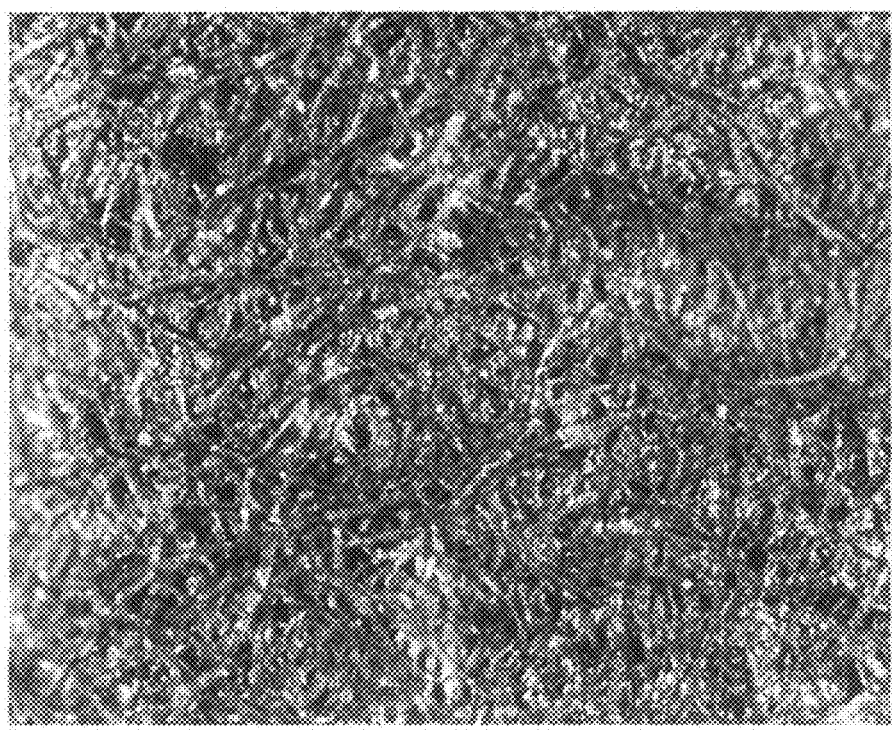
FIG. 3A is a color photograph of a surface of a stained paper towel basesheet in accordance with this invention, made in accordance with Example 13 herein, wherein the binder material has been sprayed onto both surfaces of the sheet.
Figure 3B:
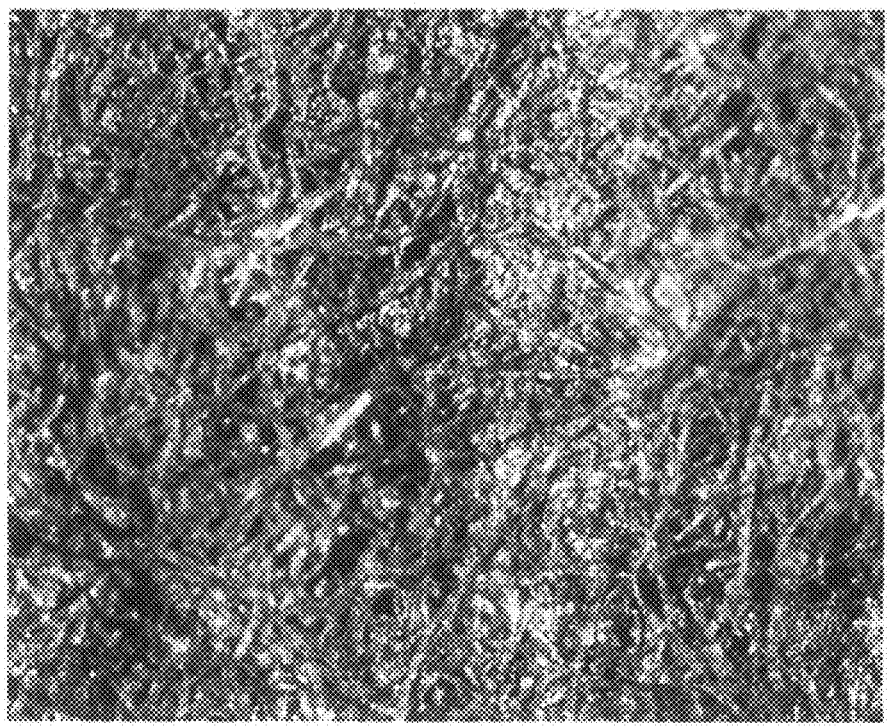
FIG. 3B is a color photograph of the opposite side of the basesheet of FIG. 3A, illustrating the binder material deposits which are also the result of spraying.
Figure 3C:
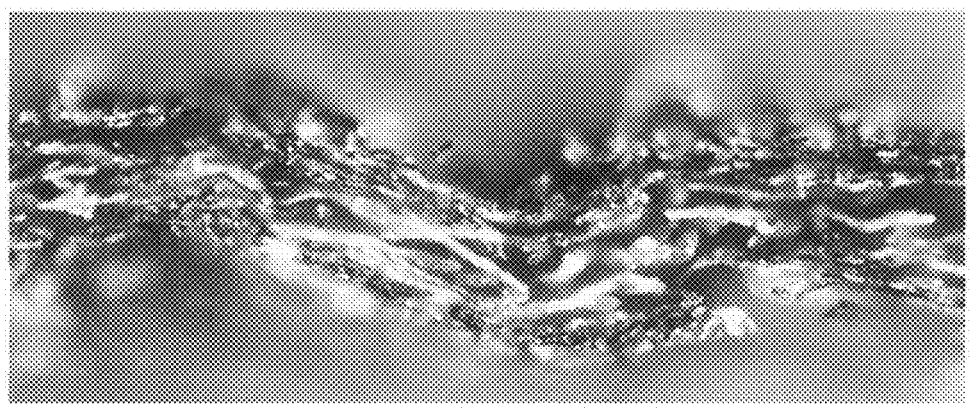
FIG. 3C is a color cross-sectional photograph of the basesheet of FIG. 3A, further illustrating the nature of the binder deposits.

Referring to FIG. 1, shown is a method of applying a topical binder material to a previously-formed basesheet or web. The binder material can be applied to one or both sides of the web. For wet laid basesheets, at least one side of the web is thereafter creped. In general, for most applications, the basesheet or web will only be creped on one side after the binder materials are applied. It should be understood, however, that in some situations it may be desirable to crepe both sides of the web. Alternatively, nonwoven manufacturing processes which may not contain a creping step, such as air-laid papermaking processes, for example, may also utilize the low odor binder of the present invention for imparting structural integrity to the web. In such cases, post-treatment with topical binder material is optional.

In all cases, prior to applying the binder material to the web, the epoxy-reactive polymer and the epoxy-functional polymer must be mixed together and the epoxy-functional polymer must be reactivated by the addition of a base to increase the pH. In their stable, less reactive form, the epoxy-functional groups within the epoxy-functional polymer are in a halohydrin form and maintained as such by a low pH. Suitably, the pH can be about 4 or 5 prior to activation. Once the pH is raised, such as to a level of 11 or higher, the halohydrin form returns to the active epoxy form. Once this occurs, the binder material must be applied to the web in a relatively short time (less than about 3 hours) for maximum binder efficiency. Consequently, the binder material may be prepared in different ways, but a convenient method of preparation is to dilute the epoxy-functional polymer with water and add a base, such as sodium hydroxide, to raise the pH above 11 and activate the epoxy groups. Thereafter, the activated epoxy-functional polymer is blended with the epoxy-reactive polymer and other components and the resulting blended binder formulation is applied to the fibrous web, such as by printing, spraying, coating, foaming, size pressing or other means. Depending upon the reactivity of the activated epoxy-functional polymer, the elapsed time between blending of the binder composition and its application to the web can be less than a day, more specifically 12 hours or less, more specifically 2 or 3 hours or less, and still more specifically about 30 minutes or less.

Returning to FIG. 1, a fibrous web 10 made according to any suitable wet-laying or air-laying process is passed through a first binder material application station 12. Station 12 includes a nip formed by a smooth rubber press roll 14 and a patterned rotogravure roll 16. Rotogravure roll 16 is in communication with a reservoir 18 containing a first binder material 20. The rotogravure roll applies the binder material to one side of web in a pre-selected pattern.

Web 10 is then contacted with a heated roll 22 after passing a roll 24. The heated roll 22 serves to at least partially dry the web. The heated roll can be heated to a temperature, for instance, up to about 121° C. and particularly from about 82° C. to about 104° C. In general, the web can be heated to a temperature sufficient to dry the web and evaporate any water. During the time the web is heated, some curing of the binder on the sheet may occur.

It should be understood, that the besides the heated roll 22, any suitable heating device can be used to dry the web. For example, in an alternative embodiment, the web can be placed in communication with a through-air dryer or an infra-red heater in order to dry the web. Other heating devices can include, for instance, any suitable convective oven, microwave oven or other suitable electromagnetic wave energy source.

From the heated roll 22, the web 10 can be advanced by pull rolls 26 to a second binder material application station generally 28. Station 28 includes a transfer roll 30 in contact with a rotogravure roll 32, which is in communication with a reservoir 34 containing a second binder material 36 to station 12, second binder material 36 is applied to the opposite side of web 10 in a pre-selected pattern. Once the second binder material is applied, web 10 is adhered to a creping roll or drum 38 by a press roll 40. The web is carried on the surface of the creping roll for a distance and then removed therefrom by the action of a creping blade 42. The creping blade performs a controlled pattern creping operation on the second side of the paper web.

In accordance with the present invention, the second binder material 36 is selected such that the web 10 can be adhered to and creped from the creping drum 38. For example, in accordance with the present invention, the creping drum can be maintained at a temperature of between 66° C. and 121° C. Operation outside of this range is also possible. In one embodiment, for example, the creping drum 38 can be at 104° C. Alternatively, the creping drum need not be heated or only heated to a relatively low temperature.

Once creped, the paper web 10 is pulled through a drying station 44. Drying station 44 can include any form of a heating unit, such as an oven energized by infrared heat, microwave energy, hot air or the like. Alternatively, the drying station may comprise other drying methods such as photo-curing, UV-curing, corona discharge treatment, electron beam curing, curing with reactive gas, curing with heated air such as through-air heating or impingement jet heating, infrared heating, contact heating, inductive heating, microwave or RF heating, and the like. The dryer may also include a fan to blow air onto the moving web. Drying station 44 may be necessary in some applications to dry the web and/or cure the first and second binder materials. Depending upon the binder materials selected, however, in other applications the drying station may not be needed.

The amount that the paper web is heated within the drying station 44 can depend upon the particular binder materials used, the amount of binder materials applied to the web, and the type of web used. In some applications, for instance, the paper web can be heated using a gas stream such as air at a temperature of about 266° C. in order to cure the binder materials. When using low cure temperature binder materials, on the other hand, the gas can be at a temperature lower than about 132° C. and particularly lower than about 121° C. In an alternative embodiment, the drying station 44 is not used to cure the binder material applied to the web. Instead, the drying station is used to dry the web and to drive off any water present in the web. In this embodiment, the web can be heated to temperatures sufficient to evaporate water, such as to a temperature of from about 90 to about 120° C. In other embodiments, room temperature air (20-40° C.) may be sufficient to dry the web. In still other embodiments, the drying station may be bypassed or removed from the process altogether.

Once passed through drying station, web 10 can be wound into a roll of material 46 for subsequent conversion into the final product. In other embodiments, the web may proceed directly into further converting operations to result in the final product without being wound into an intermediate roll.

FIGS. 2A-C and 3A-C, as previously mentioned, are photographs of products of this invention made in accordance with the examples. These photographs show the size dimension, spacing, area coverage and penetration of two potential embodiments. In order to delineate the location of the bonding material in the fibrous web, the samples were treated with DuPont Fiber Identification Stain #4 (Pylam Products Company, Inc., Garden City, N.Y.), a blend of dyes commonly used in the textile industry for fiber identification.

Figure 4:
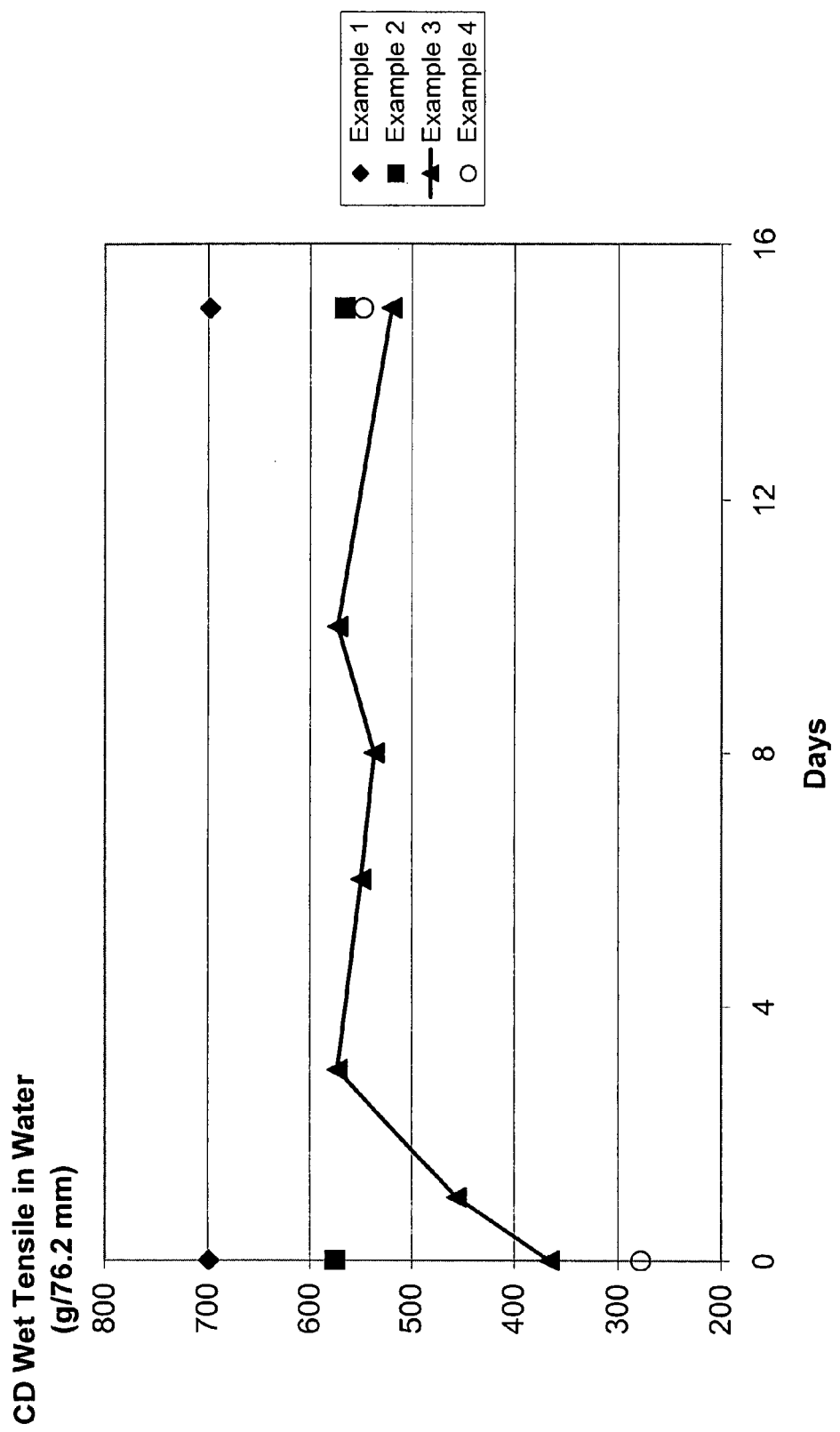
FIG. 4 is a plot of the CD wet strength as a function of time for paper towel basesheets made in accordance with Examples 1-4 described below, illustrating the effect of curing temperature on one of the binder materials of this invention.

FIG. 4 is a plot of the CD wet tensile strength in water as a function of aging time prior to testing, illustrating the wet strength development with 2.5% Kymene® 2064 addition and varying cure temperatures. It is evident from this plot that the initial CD wet tensile can be increased by curing at high temperatures, but after the samples have aged for 15 days all CD wet tensile values were similar, irregardless of the initial curing temperature.

Figure 5:
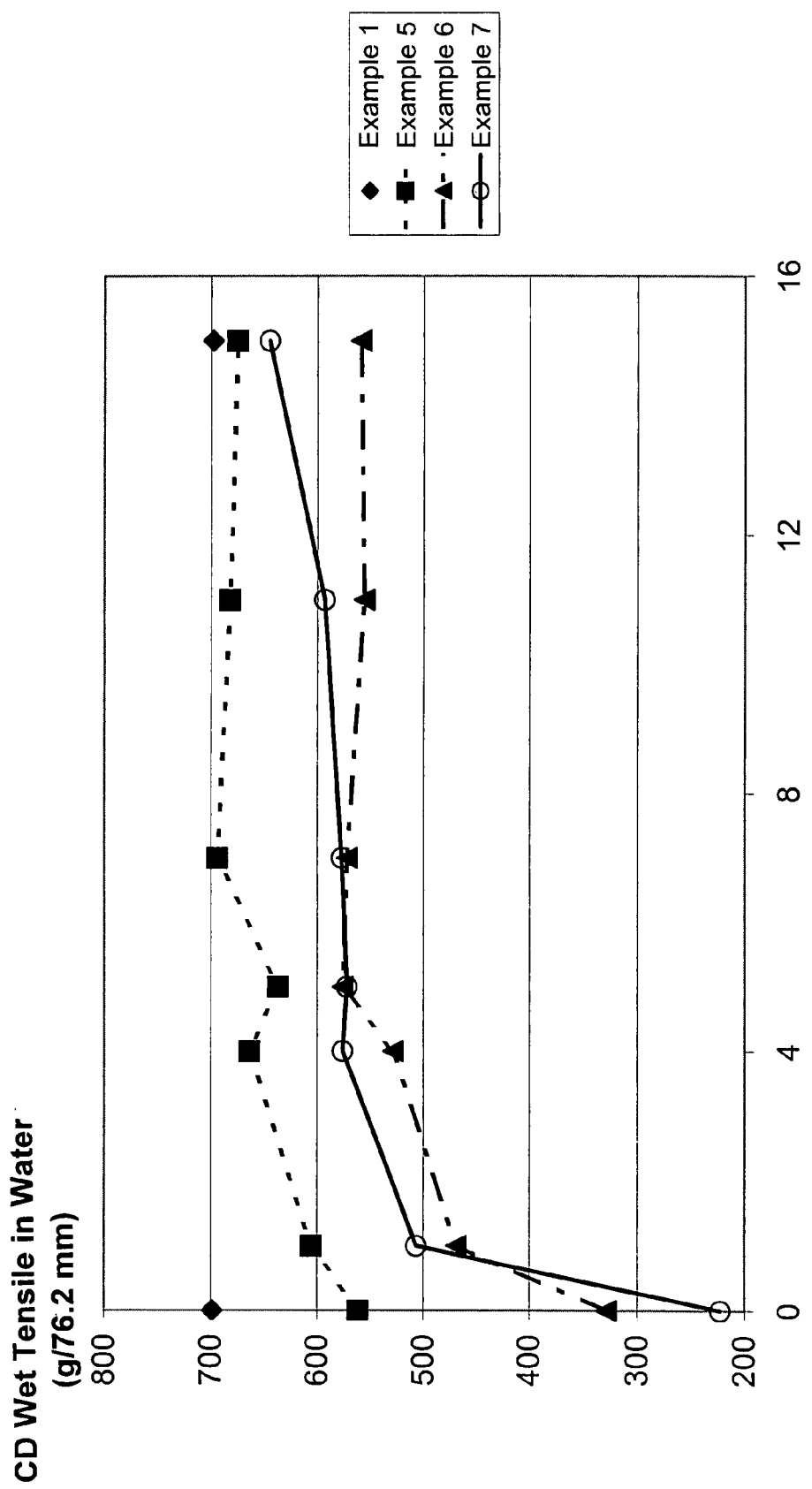
FIG. 5 is a plot, similar to that of FIG. 4, of the CD wet strength as a function of time for paper towel basesheets made in accordance with Examples 1, 5, 6 and 7 described below, illustrating the effect of curing temperature on a different binder material of this invention.

FIG. 5 is a plot of the CD wet tensile strength in water as a function of aging time prior to testing, illustrating the wet strength development with 5% Kymene® 2064 addition and varying cure temperatures. A similar trend of wet tensile development with aging time, as was demonstrated in FIG. 4, is also evident in this plot.

Figure 6:
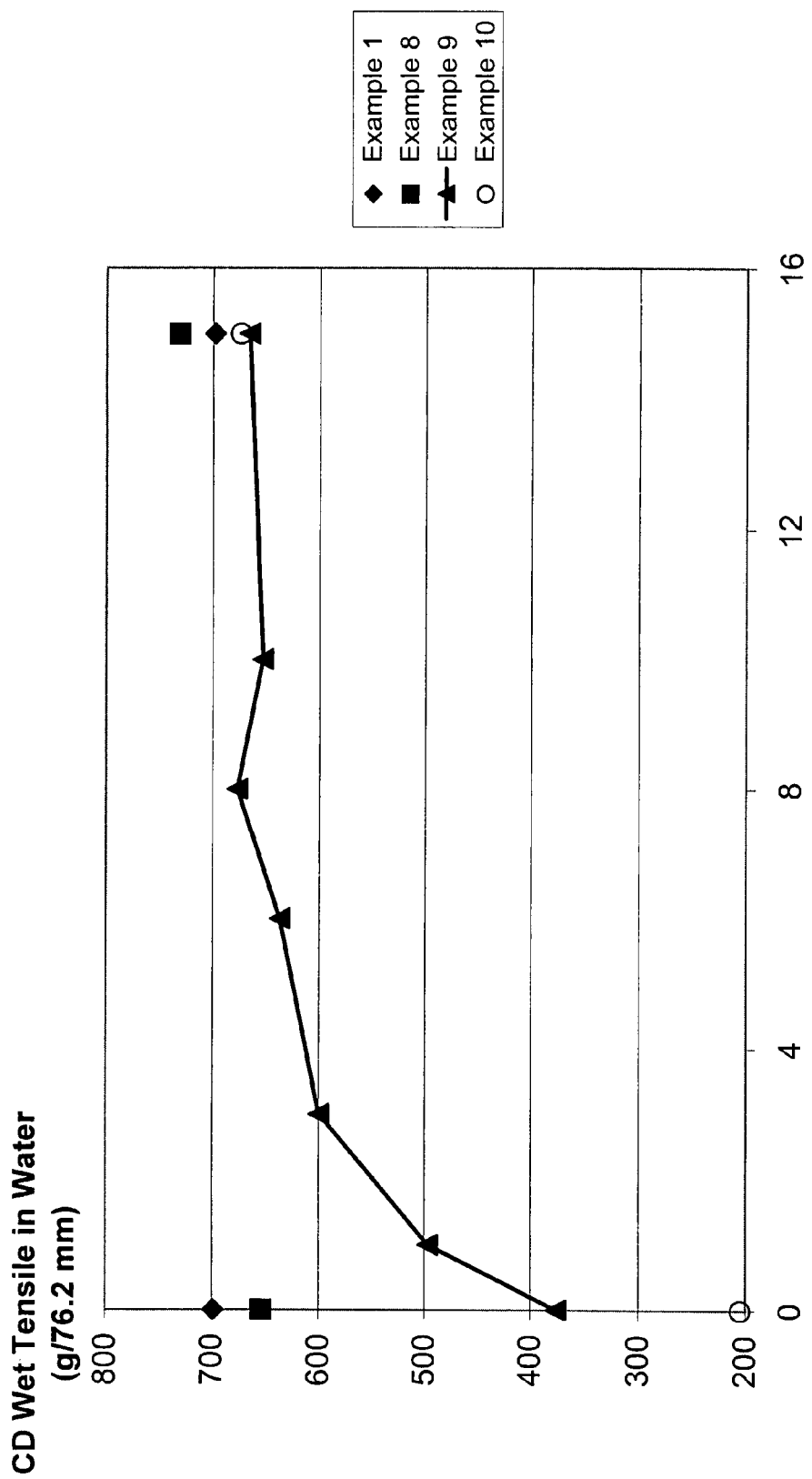
FIG. 6 is a plot, similar to FIGS. 4 and 5, of the CD wet strength as a function of time for paper towel basesheets made in accordance with Examples 1, 8, 9 and 10 described below, illustrating the effect of curing temperature on a different binder material of this invention.

FIG. 6 is a plot of the CD wet tensile strength in water as a function of aging time prior to testing, illustrating the wet strength development with 10% Kymene® 2064 addition and varying cure temperatures. A similar trend of wet tensile development with aging time, as was demonstrated in FIGS. 4 and 5, is also evident in this plot.

Figure 7:
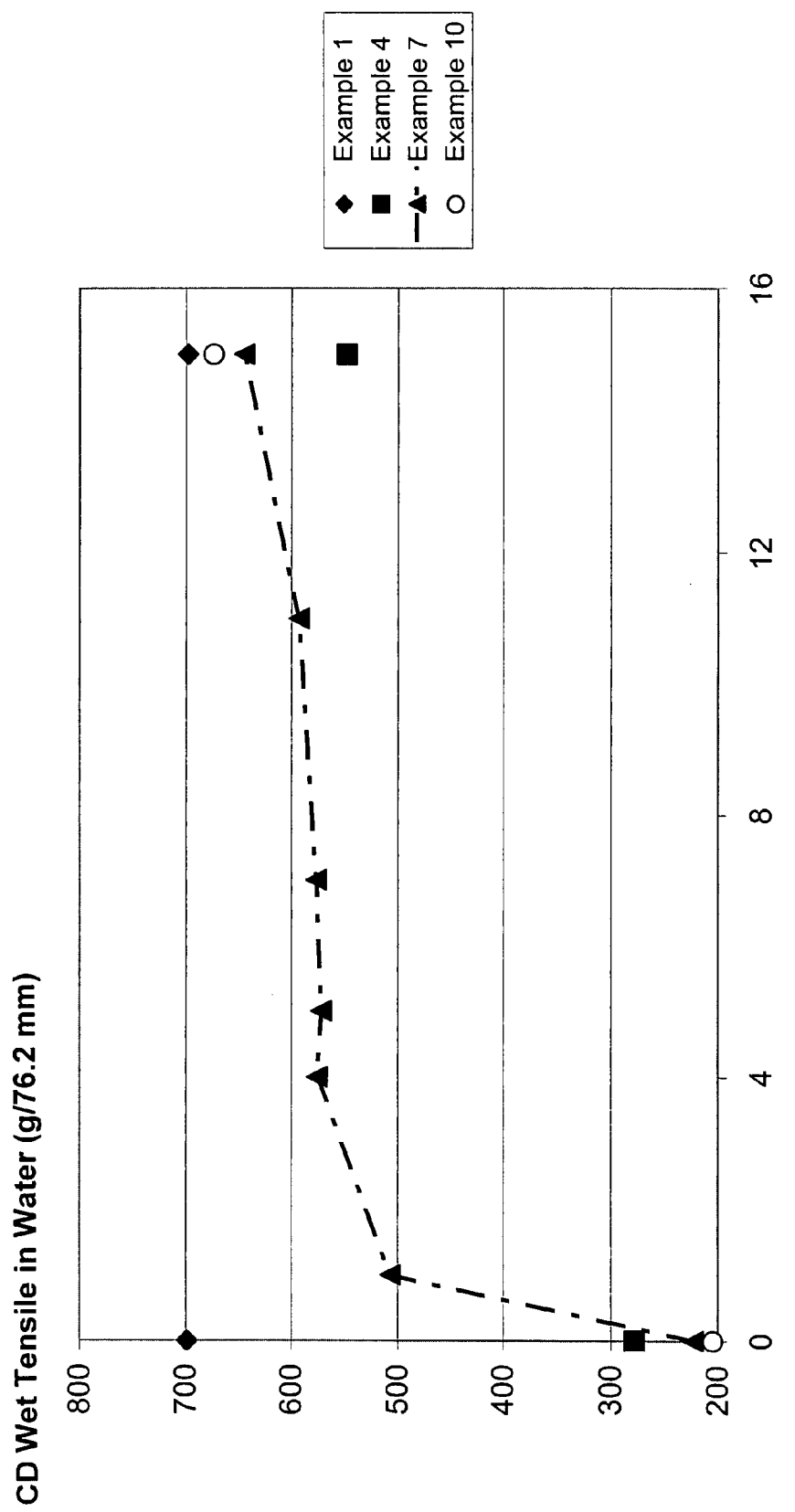
FIG. 7 is a plot of the CD wet strength as a function of time for the paper towel basesheets cured at 38° C. in accordance with Examples 1, 4, 7 and 10, illustrating the effect of varying levels of epoxy-functional polymer (Kymene® 2064) at constant curing temperature.

FIG. 7 is a plot of the CD wet tensile strength in water as a function of aging time prior to testing, illustrating the CD wet tensile strength cured at 38° C. with varying Kymene® 2064 addition levels. From this plot the level of Kymene® 2064 in the binder recipe does not appear to impact the initial wet tensile values, but does impact the aged wet tensile values, with the higher level of Kymene® 2064 resulting in a higher level of wet tensile strength.

Figure 8:
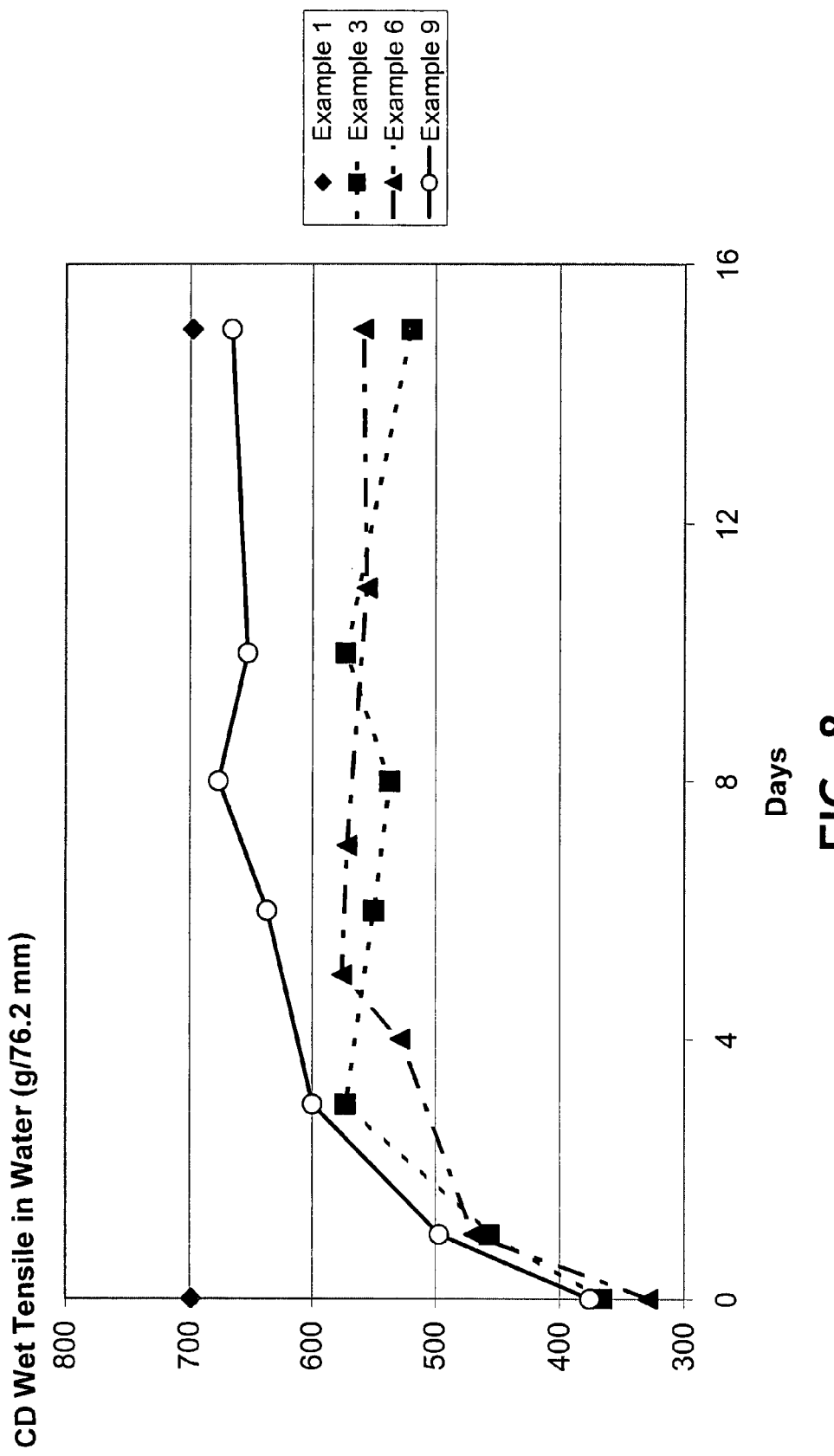
FIG. 8 is a plot, similar to that of FIG. 7, of the CD wet strength as a function of time for the paper towel basesheets cured at 149° C. in accordance with Examples 1, 3, 6 and 9, further illustrating the effect of varying levels of epoxy-functional polymer at a different constant curing temperature.

FIG. 8 is a plot of the CD wet tensile strength in water as a function of aging time prior to testing, illustrating the CD wet tensile strength cured at 149° C. with varying Kymene® 2064 addition levels. From this plot the level of Kymene® 2064 in the binder recipe does not appear to impact the initial wet tensile values, but does impact the aged wet tensile values, with the higher level of Kymene® 2064 resulting in a higher level of wet tensile strength.

Figure 9:
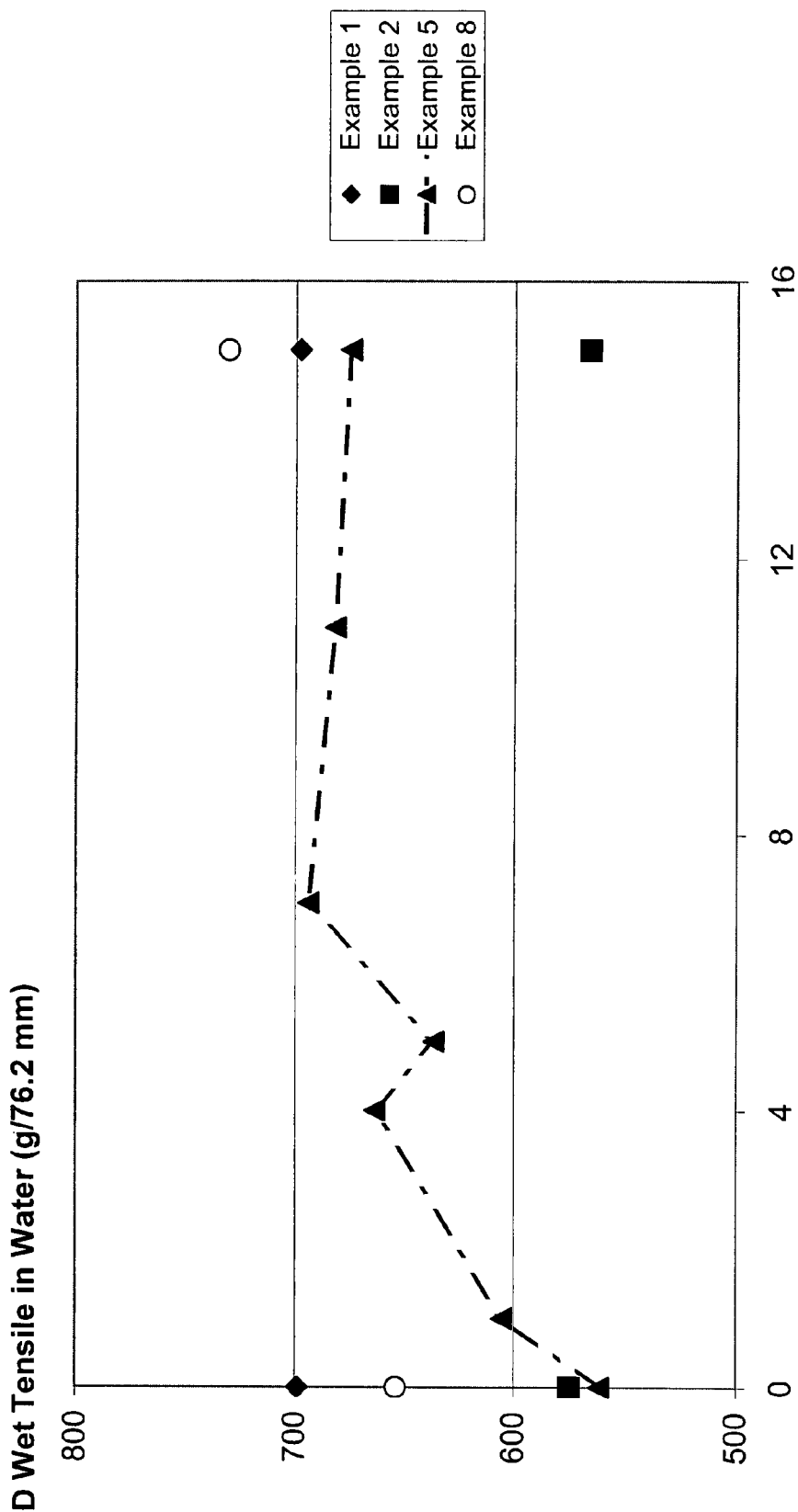
FIG. 9 is a plot similar to that of FIGS. 7 and 8, but for a curing temperature of 260° C.

FIG. 9 is a plot of the CD wet tensile strength in water as a function of aging time prior to testing, illustrating the CD wet tensile strength cured at 260° C. with varying Kymene® 2064 addition levels. From this plot the level of Kymene® 2064 in the binder recipe does not appear to impact the initial wet tensile values, but does impact the aged wet tensile values, with the higher level of Kymene® 2064 resulting in a higher level of wet tensile strength.

FIG. 10 is plot of the CD wet tensile strength in water as a function of aging time prior to testing, illustrating the improvement in wet strength using the binder material of this invention in the presence of glyoxal.

EXAMPLES

Example 1. (Comparative)

A tissue machine was used to produce a layered, uncreped through-air-dried (UCTAD) basesheet generally as described in the following U.S. patents: U.S. Pat. No. 5,607,551, issued Mar. 4, 1997 to Farrington et al.; U.S. Pat. No. 5,672,248 issued Sep. 30, 1997 to Wendt et al.; and U.S. Pat. No. 5,593,545 issued Jan. 14, 1997 to Rugowski et al., all of which are hereby incorporated by reference. After manufacture on the tissue machine, the UCTAD basesheet was printed on each side with a latex-based binder. The binder-treated sheet was adhered to the surface of a Yankee dryer to re-dry the sheet and thereafter the sheet was creped and thermally cured. The resulting sheet was tested for physical properties immediately after manufacture and then periodically during a 2 week period to monitor development of strength properties after natural aging at room temperature (about 23° C.) and humidity (about 50% relative humidity).

More specifically, the basesheet was made from a stratified fiber furnish containing a center layer of fibers positioned between two outer layers of fibers. Both outer layers of the UCTAD basesheet contained 100% northern softwood kraft pulp and about 6.5 kilograms (kg)/metric ton (Mton) of dry fiber of a debonding agent, ProSoft® TQ1003 (Hercules, Inc.). Combined, the outer layers comprised 50% of the total fiber weight of the sheet (25% in each layer). The center layer, which comprised 50% of the total fiber weight of the sheet, was also comprised of northern softwood kraft pulp. The fibers in this layer were also treated with 6.5 kg/Mton of ProSoft® TQ1003 debonder.

The machine-chest furnish containing the chemical additives was diluted to approximately 0.2 percent consistency and delivered to a layered headbox. The forming fabric speed was approximately 445 meters per minute. The resulting web was then rush-transferred to a transfer fabric (Voith Fabrics, 807) traveling 17% slower than the forming fabric using a vacuum box to assist the transfer. At a second vacuum-assisted transfer, the web was transferred and wet-molded onto the through drying fabric (Voith Fabrics, t1203-9). The web was dried with a through-air-dryer resulting in a basesheet with an air-dry basis weight of approximately 56 grams per square meter (gsm).

The resulting sheet was fed to a gravure printing line, similar to that shown in FIG. 1, traveling at about 200 feet per minute (61 meters per minute) where a latex binder was printed onto the surface of the sheet. The first side of the sheet was printed with a bonding formulation using direct rotogravure printing. Then the printed web passed over a heated roll with a surface temperature of approximately 104° C. to evaporate water. Next, the second side of the sheet was printed with the bonding formulation using a second direct rotogravure printer. The sheet was then pressed against and doctored off a rotating drum, which had a surface temperature of approximately 104° C. Finally the sheet was dried and the bonding material cured using air heated to about 260° C. and wound into a roll.

Thereafter the print/print/creped sheet was removed from the roll and tested for basis weight, caliper and tensile strength.

The latex binder in this example was a vinyl acetate ethylene copolymer, Airflex® EN1165, which was obtained from Air Products and Chemicals, Inc. of Allentown, Pa. Approximately 5.7% by weight Airflex® EN1165 was applied to the sheet.

The bonding formulation contained the following ingredients, listed in their order of addition.

| | |
|---|---|
| 1. Airflex ® EN1165 (52% solids) | 10,500 g |
| 2. Defoamer (Nalco 7565) | 54 g |
| 3. Water | 3,400 g |
| 4. LiCl solution tracer (10% solids) | 50 g |
| 5. Citric Acid Catalyst (10% solids) | 540 g |
| 6. Natrosol 250MR, Hercules (2% solids) | 1,200 g |

The amount of Natrosol thickener added to the formulation was based on requirements to achieve approximately 120 centipoise (cps) viscosity. All ingredients were added to the EN1165 latex emulsion under mild agitation. After all ingredients had been added, the print fluid was allowed to mix for approximately 15 minutes prior to use in the gravure printing operation.

Lithium Chloride (LiCl) salt was added to the bonding formulation as a tracer to enable latex addition level to be analyzed using atomic absorption spectroscopy. An amount of LiCl no less than 250 parts per million (ppm) was added in the bonding formulation to ensure accurate detection measurement. The LiCl granules were dissolved in water and then added to the bonding formulation under agitation. After applying the bonding formulation to a basesheet, a sample of the bonding formulation and also a sample of the bonded sheet were collected for analysis.

The bonding formulation and bonded sheet were analyzed using atomic absorption spectroscopy to determine the percentage of latex add-on. First a calibration curve of absorbance vs. lithium concentration in ppm was created with standard LiCl solutions in water. The bonding formulations and bonded sheet were analyzed with atomic absorption spectroscopy after undergoing a series of combustion and water extraction steps to capture all lithium ions present in the respective samples. The weights of LiCl in the bonding formulation and bonded sheet samples were obtained by comparing their atomic absorbance values to the LiCl calibration curve. The concentration of LiCl in the bonding formulation was calculated, and then the weight of LiCl in each bonded sheet sample was converted into the amount of bonding formulation ($W_t(BF)$) applied to the sheet based on the LiCl content in the bonding formulation. Since the total solids content of the bonding formulation, $S_T$, and latex solids content, $S_L$, in the total solids are known, the percent of latex solids add-on (Latex %) can be calculated using the following equation:

$$\text{Latex \%} = \frac{W_t(BF) \times S_T \times S_L}{W_t(\text{Sample})} \times 100$$

where $W_t(BF)$ is the weight of bonding formulation applied to the sheet in milligrams (mg), $W_t(\text{Sample})$ is the weight of bonded sheet in mg, $S_T$ is the weight percent content of total solids in the bonding formulation, and $S_L$ is the weight percent of latex solids in the total solids.

The amount of Airflex® EN1165 latex applied to the sheet was approximately 5.7% by weight.

The viscosity of the print fluid was 118 cps, when measured at room temperature using a viscometer (Brookfield® Synchro-lectric viscometer Model RVT, Brookfield Engineering Laboratories Inc. Stoughton, Mass.) with a #1 spindle operating at 20 rpm. The oven-dry solids of the print fluid was 36.9 weight percent. The print fluid pH was 3.7.

The resulting single-ply bonded sheet was tested for tensile strength, basis weight and caliper shortly after manufacture. The tensile strength properties were also tested periodically over the 15 days following manufacture.

Example 2. (Invention)

A single-ply bonded sheet was produced as described in Example 1, except the binder recipe in this example contained a carboxylated vinyl acetate-ethylene terpolymer, Airflex® 426, which was obtained from Air Products and Chemicals, Inc. of Allentown, Pa. The latex binder addition was measured using atomic absorption.

The bonding formulation for this example was prepared as two separate mixtures, called the "latex" and "reactant". The "latex" material contained the epoxy-reactive polymer and the "reactant" was the epoxy-functional polymer. The procedure calls for each mixture to be made up independently, and then combined together prior to use. After the latex and reactant mixtures were combined, the appropriate amount of "thickener" (Natrosol solution) was added to adjust viscosity.

The "latex" and "reactant" mixtures contained the following ingredients, listed in their order of addition.

| Latex | |
|---|---|
| 1. Airflex ® 426 (62.7% solids) | 8,555 g |
| 2. Defoamer (Nalco 7565) | 50 g |
| 3. Water | 4,377 g |
| 4. LiCl solution tracer (10% solids) | 50 g |

| Reactant | |
|---|---|
| 1. Kymene ® 2064 (20% solids) | 673 g |
| 2. Water | 1,000 g |
| 3. NaOH (10% solution) | 350 g |

When the NaOH had been added, the pH of the reactant mixture was approximately 12. After all reactant ingredients were added, the mixture was allowed to mix for at least 15 minutes prior to adding to the latex mixture.

| Thickener | |
|---|---|
| 1. Natrosol 250MR, Hercules (2% solids) | 1,200 g |

After all ingredients had been added, the print fluid was allowed to mix for approximately 5-30 minutes prior to use in the gravure printing operation. For this bonding formulation, the weight percent ratio of epoxy-functional polymer based on carboxylic acid-functional polymer (epoxy-reactive polymer) was about 2.5%.

The viscosity of the print fluid was 110 cps, when measured at room temperature using a viscometer (Brookfield® Synchro-lectric viscometer Model RVT, Brookfield Engineering Laboratories Inc. Stoughton, Mass.) with a #1 spindle operating at 20 rpm. The oven-dry solids of the print fluid was 34.5 weight percent. The print fluid pH was 5.2.

The resulting single-ply bonded sheet was tested for tensile strength, basis weight and caliper shortly after manufacture. The tensile strength properties were also tested periodically over the 15 days following manufacture. The latex binder addition was measured using atomic absorption. Approximately 5.3% by weight Airflex® 426 was applied to the sheet.

Example 3 (Invention)

A single-ply bonded sheet was produced as described in Example 2, except the cure air temperature was about 149° C. The resulting single-ply sheet was tested for tensile strength, basis weight and caliper shortly after manufacture. The tensile strength properties were also tested periodically over the 15 days following manufacture. The latex binder addition was measured using atomic absorption. Approximately 5.5% by weight Airflex® 426 was applied to the sheet.

Example 4. (Invention)

A single-ply bonded sheet was produced as described in Example 2, except there was no additional heating of the cure air. The temperature of the cure air was approximately 38° C. The resulting single-ply bonded sheet was tested for tensile strength, basis weight and caliper shortly after manufacture. The tensile strength properties were also tested periodically over the 15 days following manufacture. The latex binder addition was measured using atomic absorption. Approximately 5.1% by weight Airflex® 426 was applied to the sheet.

Example 5. (Invention)

A single-ply bonded sheet was produced as described in Example 2, but using a different binder recipe. The ingredients of the "latex", "reactant" and "thickener" used for Examples 5-7 are listed below.

| Latex | |
|---|---|
| 1. Airflex ® 426 (62.7% solids) | 8,555 g |
| 2. Defoamer (Nalco 7565) | 48 g |
| 3. Water | 2,344 g |
| 4. LiCl solution tracer (10% solids) | 48 g |

| Reactant | |
|---|---|
| 1. Kymene ® 2064 (20% solids) | 1,356 g |
| 2. Water | 2,000 g |
| 3. NaOH (10% solution) | 700 g |

When the NaOH had been added, the pH of the reactant mixture was approximately 12. After all reactant ingredients were added, the mixture was allowed to mix for at least 15 minutes prior to adding to the latex mixture.

| Thickener | |
|---|---|
| 1. Natrosol 250MR, Hercules (2% solids) | 600 g |

After all ingredients had been added, the print fluid was allowed to mix for approximately 5-30 minutes prior to use in the gravure printing operation. For this bonding formulation, the weight percent ratio of epoxy-functional polymer based on carboxylic acid-functional polymer was 5.0%.

The viscosity of the print fluid was 122 cps, when measured at room temperature using a viscometer (Brookfield® Synchro-lectric viscometer Model RVT, Brookfield Engineering Laboratories Inc. Stoughton, Mass.) with a #1 spindle operating at 20 rpm. The oven-dry solids of the print fluid was 36.7 weight percent. The print fluid pH was 5.4.

The resulting single-ply bonded sheet was tested for tensile strength, basis weight and caliper shortly after manufacture. The tensile strength properties were also tested periodically over the 15 days following manufacture. The latex binder addition was measured using atomic absorption. Approximately 4.8% by weight Airflex® 426 was applied to the sheet.

Example 6 (Invention)

A single-ply bonded sheet was produced as described in Example 5, except the cure air temperature was about 149° C. The resulting single-ply bonded sheet was tested for tensile strength, basis weight and caliper shortly after manufacture. The tensile strength properties were also tested periodically over the 15 days following manufacture. The latex binder addition was measured using atomic absorption. Approximately 5.0% by weight Airflex® 426 was applied to the sheet.

Example 7. (Invention)

A single-ply bonded sheet was produced as described in Example 5, except there was no additional heating of the cure air. The temperature of the cure air was approximately 38° C. The resulting single-ply bonded sheet was tested for tensile strength, basis weight and caliper shortly after manufacture. The tensile strength properties were also tested periodically over the 15 days following manufacture. The latex binder addition was measured using atomic absorption. Approximately 5.2% by weight Airflex® 426 was applied to the sheet.

Example 8. (Invention)

A single-ply bonded sheet was produced as described in Example 2, but using a different binder recipe. The ingredients of the "latex", "reactant" and "thickener" used for Examples 8-10 are listed below.

| Latex | |
|---|---|
| 1. Airflex ® 426 (62.7% solids) | 8,560 g |
| 2. Defoamer (Nalco 7565) | 49 g |
| 3. Water | 1,800 g |
| 4. LiCl solution tracer (10% solids) | 54 g |

| Reactant | |
|---|---|
| 1. Kymene ® 2064 (20% solids) | 2,712 g |
| 2. Water | 2,301 g |
| 3. NaOH (10% solution) | 1,400 g |

After the NaOH had been added, the pH of the reactant mixture was approximately 12. After all reactant ingredients were added, the mixture was allowed to mix for at least 15 minutes prior to adding to the latex mixture.

| Thickener | |
|---|---|
| 1. Natrosol 250MR, Hercules (2% solids) | 0 g |

After all ingredients had been added, the print fluid was allowed to mix for approximately 5-30 minutes prior to use in the gravure printing operation. For this bonding formulation, the weight percent ratio of epoxy-functional polymer based on carboxylic acid-functional polymer was 10%.

The viscosity of the print fluid was 155 cps, when measured at room temperature using a viscometer (Brookfield® Synchro-lectric viscometer Model RVT, Brookfield Engineering Laboratories Inc. Stoughton, Mass.) with a #1 spindle operating at 20 rpm. The oven-dry solids of the print fluid was 36.2 weight percent. The print fluid pH was 6.7.

The resulting single-ply bonded sheet was tested for tensile strength, basis weight and caliper shortly after manufacture. The tensile strength properties were also tested periodically over the 15 days following manufacture. The latex binder addition was measured using atomic absorption. Approximately 4.5% by weight Airflex® 426 was applied to the sheet.

Example 9 (Invention)

A single-ply bonded sheet was produced as described in Example 8, except the cure air temperature was about 149° C. The resulting single-ply bonded sheet was tested for tensile strength, basis weight and caliper shortly after manufacture. The tensile strength properties were also tested periodically over the 15 days following manufacture. The latex binder addition was measured using atomic absorption. Approximately 4.1% by weight Airflex® 426 was applied to the sheet.

Example 10. (Invention)

A single-ply bonded sheet was produced as described in Example 8, except there was no additional heating of the cure air. The temperature of the cure air was approximately 38° C. The resulting single-ply bonded sheet was tested for tensile strength, basis weight and caliper shortly after manufacture. The tensile strength properties were also tested periodically over the 15 days following manufacture. The latex binder addition was measured using atomic absorption. Approximately 4.6% by weight Airflex® 426 was applied to the sheet.

Example 11. (Invention)

A single-ply bonded sheet was produced as described in Example 2, but using a different binder recipe which also incorporated glyoxal as a crosslinking agent in the latex formulation. The temperature of the cure air was approximately 38° C. The ingredients of the "latex", "reactant" and "thickener" are listed below.

| Latex | |
|---|---|
| 1. Airflex ® 426 (62.7% solids) | 8,555 g |
| 2. Defoamer (Nalco 7565) | 48 g |
| 3. Water | 1,000 g |
| 4. LiCl solution tracer (10% solids) | 51 g |
| 5. Glyoxal (40% solids) | 1,349 g |

| Reactant | |
|---|---|
| 1. Kymene ® 2064 (20% solids) | 1,354 g |
| 2. Water | 2,004 g |
| 3. NaOH (10% solution) | 700 g |

When the NaOH had been added, the pH of the reactant mixture was approximately 12. After all reactant ingredients were added, the mixture was allowed to mix for at least 15 minutes prior to adding to the latex mixture.

| Thickener | |
|---|---|
| 1. Natrosol 250MR, Hercules (2% solids) | 300 g |

After all ingredients had been added, the print fluid was allowed to mix for approximately 5-30 minutes prior to use in the gravure printing operation. For this bonding formulation, the weight percent ratio of epoxy-functional polymer based on carboxylic acid-functional polymer was 5.0% and the weight percent ratio of glyoxal based on carboxylic acid-functional polymer was 10%.

The viscosity of the print fluid was 118 cps, when measured at room temperature using a viscometer (Brookfield® Synchro-lectric viscometer Model RVT, Brookfield Engineering Laboratories Inc. Stoughton, Mass.) with a #1 spindle operating at 20 rpm. The oven-dry solids of the print fluid was 40.4 weight percent. The print fluid pH was 5.3.

The resulting single-ply bonded sheet was tested for tensile strength, basis weight and caliper shortly after manufacture. The tensile strength properties were also tested periodically over the 15 days following manufacture. The latex binder addition was measured using atomic absorption. Approximately 6.1% by weight Airflex® 426 was applied to the sheet.

The test results from Examples 1-11 are summarized in Table 1 below.

TABLE 1

| Example | Test Day | MD Tensile g/76.2 mm | MD Stretch % | MD TEA g * cm/sq. cm | MD Slope g | CD Tensile g/76.2 mm | CD Stretch % | CD TEA g * cm/sq. cm | CD Slope g |
|---|---|---|---|---|---|---|---|---|---|
| 1 | 0 | 1459 | 32.1 | 22.5 | 2075 | 1184 | 14.0 | 12.4 | 7464 |
|   | 15 | 1379 | 33.0 | 21.2 | 1763 | 1155 | 14.2 | 12.4 | 7991 |
| 2 | 0 | 1614 | 33.9 | 26.4 | 2233 | 1404 | 14.2 | 14.9 | 8809 |
|   | 15 | 1720 | 33.9 | 26.9 | 1984 | 1363 | 14.8 | 15.6 | 8935 |
| 3 | 0 | 1603 | 39.0 | 29.3 | 1790 | 1399 | 14.4 | 15.0 | 8596 |
|   | 1 | — | — | — | — | — | — | — | — |
|   | 3 | — | — | — | — | — | — | — | — |
|   | 6 | 1611 | 42.9 | 30.2 | 1272 | 1454 | 16.5 | 18.9 | 9009 |
|   | 8 | — | — | — | — | — | — | — | — |
|   | 10 | — | — | — | — | — | — | — | — |
|   | 15 | 1554 | 38.3 | 25.9 | 1373 | 1383 | 14.7 | 16.0 | 9953 |
| 4 | 0 | 1532 | 46.1 | 32.4 | 1471 | 1506 | 14.6 | 17.0 | 9644 |
|   | 15 | 1578 | 47.4 | 32.4 | 1127 | 1516 | 15.0 | 17.9 | 10313 |
| 5 | 0 | 1671 | 34.1 | 26.8 | 2111 | 1312 | 15.2 | 15.0 | 7751 |
|   | 1 | — | — | — | — | — | — | — | — |
|   | 4 | — | — | — | — | — | — | — | — |
|   | 5 | 1803 | 42.1 | 32.7 | 1612 | 1450 | 15.6 | 17.4 | 8875 |
|   | 7 | — | — | — | — | — | — | — | — |
|   | 11 | — | — | — | — | — | — | — | — |
|   | 15 | 1784 | 32.5 | 26.5 | 2068 | 1464 | 15.6 | 17.9 | 8998 |
| 6 | 0 | 1524 | 40.6 | 28.7 | 1473 | 1254 | 15.7 | 15.3 | 7871 |
|   | 1 | — | — | — | — | — | — | — | — |
|   | 4 | — | — | — | — | — | — | — | — |
|   | 5 | 1673 | 42.0 | 30.5 | 1517 | 1430 | 15.1 | 16.6 | 9212 |
|   | 7 | — | — | — | — | — | — | — | — |
|   | 11 | — | — | — | — | — | — | — | — |
|   | 15 | 1742 | 37.9 | 28.3 | 1528 | 1406 | 14.9 | 16.2 | 8800 |
| 7 | 0 | 1531 | 50.3 | 32.6 | 1088 | 1348 | 16.4 | 17.5 | 8547 |
|   | 1 | — | — | — | — | — | — | — | — |
|   | 4 | — | — | — | — | — | — | — | — |
|   | 5 | 1532 | 47.0 | 30.7 | 1249 | 1606 | 15.3 | 19.0 | 9784 |
|   | 7 | — | — | — | — | — | — | — | — |
|   | 11 | — | — | — | — | — | — | — | — |
|   | 15 | 1799 | 45.9 | 34.9 | 1355 | 1594 | 14.3 | 17.5 | 10237 |

| Example | Test Day | CD Wet Tensile Water g/76.2 mm | CD Wet Stretch % | Wet/Dry % | CD Wet Tensile Formula 409(pH 11.5) g/76.2 mm | Basis Weight gsm |
|---|---|---|---|---|---|---|
| 1 | 0 | 699 | 12.5 | 59 | — | 67.2 |
|   | 15 | 698 | 12.5 | 60 | 676 | — |
| 2 | 0 | 575 | 10.0 | 41 | — | 68.7 |
|   | 15 | 566 | 9.7 | 42 | 423 | — |
| 3 | 0 | 366 | 8.5 | 26 | — | 69.6 |
|   | 1 | 456 | 9.9 | — | — | — |
|   | 3 | 573 | 8.2 | — | — | — |
|   | 6 | 550 | 9.0 | 38 | — | — |
|   | 8 | 537 | 9.2 | — | — | — |
|   | 10 | 573 | 8.2 | — | — | — |
|   | 15 | 520 | 9.5 | 38 | 403 | — |
| 4 | 0 | 278 | 6.5 | 18 | — | 75.3 |
|   | 15 | 548 | 9.0 | 36 | 446 | — |
| 5 | 0 | 562 | 12.4 | 43 | — | 68.9 |
|   | 1 | 606 | 11.0 | — | — | — |
|   | 4 | 664 | 10.5 | — | — | — |
|   | 5 | 637 | 10.4 | 44 | — | — |
|   | 7 | 694 | 10.2 | — | — | — |
|   | 11 | 682 | 10.0 | — | — | — |
|   | 15 | 675 | 10.2 | 46 | 507 | — |
| 6 | 0 | 329 | 9.0 | 26 | — | 71.6 |
|   | 1 | 469 | 10.5 | — | — | — |
|   | 4 | 529 | 10.3 | — | — | — |
|   | 5 | 576 | 9.1 | 40 | — | — |
|   | 7 | 572 | 9.7 | — | — | — |
|   | 11 | 556 | 9.3 | — | — | — |
|   | 15 | 559 | 9.7 | 40 | 447 | — |

TABLE 1-continued

| | | | | | | |
|---|---|---|---|---|---|---|
| 7 | 0 | 223 | 6.8 | 17 | — | 74.7 |
| | 1 | 507 | 9.7 | — | — | — |
| | 4 | 576 | 10.1 | — | — | — |
| | 5 | 572 | 9.6 | 36 | — | — |
| | 7 | 577 | 9.1 | — | — | — |
| | 11 | 593 | 8.6 | — | — | — |
| | 15 | 645 | 9.1 | 40 | 477 | — |

| Example | Test Day | MD Tensile g/76.2 mm | MD Stretch % | MD TEA g * cm/sq. cm | MD Slope g | CD Tensile g/76.2 mm | CD Stretch % | CD TEA g * cm/sq. cm | CD Slope g |
|---|---|---|---|---|---|---|---|---|---|
| 8 | 0 | 1665 | 33.4 | 26.9 | 2510 | 1389 | 13.5 | 13.7 | 8526 |
| | 15 | 1571 | 32.9 | 24.7 | 1843 | 1288 | 14.5 | 14.4 | 9019 |
| 9 | 0 | 1673 | 40.4 | 31.2 | 1842 | 1439 | 14.7 | 16.2 | 8896 |
| | 1 | — | — | — | — | — | — | — | — |
| | 3 | — | — | — | — | — | — | — | — |
| | 6 | 1779 | 40.1 | 31.3 | 1649 | 1566 | 14.6 | 17.6 | 10162 |
| | 8 | — | — | — | — | — | — | — | — |
| | 10 | — | — | — | — | — | — | — | — |
| | 15 | 1802 | 39.7 | 30.6 | 1447 | 1472 | 15.7 | 18.2 | 9576 |
| 10 | 0 | 1509 | 46.4 | 32.7 | 1494 | 1417 | 15.4 | 16.9 | 8691 |
| | 15 | 1633 | 45.2 | 32.3 | 1273 | 1479 | 15.5 | 18.1 | 9778 |
| 11 | 0 | 1623 | 43.5 | 30.1 | 1361 | 1516 | 13.8 | 15.8 | 9465 |
| | 15 | 1618 | 41.5 | 29.5 | 1452 | 1479 | 12.6 | 14.1 | 10462 |

| Example | Test Day | CD Wet Tensile Water g/76.2 mm | CD Wet Stretch % | Wet/Dry % | CD Wet Tensile Formula 409(pH 11.5) g/76.2 mm | Basis Weight gsm |
|---|---|---|---|---|---|---|
| 8 | 0 | 654 | 10.7 | 47 | — | 69.6 |
| | 15 | 731 | 10.4 | 57 | 543 | — |
| 9 | 0 | 376 | 7.9 | 26 | — | 71.9 |
| | 1 | 497 | 9.8 | — | — | — |
| | 3 | 600 | 8.6 | — | — | — |
| | 6 | 637 | 9.3 | 41 | — | — |
| | 8 | 677 | 10.0 | — | — | — |
| | 10 | 653 | 10.0 | — | — | — |
| | 15 | 666 | 10.4 | — | 506 | — |
| 10 | 0 | 205 | 5.6 | 14 | — | 76.4 |
| | 15 | 674 | 10.2 | 46 | 498 | — |
| 11 | 0 | 526 | 8.5 | 35 | — | 68.6 |
| | 15 | 909 | 9.0 | 61 | 521 | — |

The data in Table 1 demonstrates the ability of the inventive binder to develop wet tensile strength without the need of the high temperature thermal curing required for the control binder (Example 1). The level of dry tensile, stretch and TEA of the inventive binder was equivalent or improved versus the control for many codes.

Example 12 (Invention)

A single-ply, one-side bonded sheet was produced by a spray application of a low odor, room temperature-curing bonding formulation. Specifically, an untreated UCTAD tissue basesheet was manufactured as described in Example 1. The basesheet was then cut into 25.4 cm by 33 cm samples (with the long dimension in the machine direction of the web) for purposes of spray application of the bonding formulation. The ingredients of the "latex" and "reactant" used for Examples 12 and 13 are listed below.

| Latex | |
|---|---|
| 1. Airflex ® 426 (62.7% solids) | 400 g |
| 2. Water | 231 g |

| Reactant | |
|---|---|
| 1. Kymene ® 2064 (20% solids) | 64 g |
| 2. Water | 95 g |
| 3. NaOH (10% solution) | 33 g |

When the NaOH had been added, the pH of the reactant mixture was approximately 12. After all reactant ingredients were added, the mixture was allowed to mix for at least 15 minutes prior to adding to the latex mixture. After mixing for 5 minutes, a 246 gram sample was removed and diluted with water to produce the final bonding formulation.

| Dilution Water | |
|---|---|
| 1. Water (added to 246 grams of above mixture) | 654 g |

After the dilution water had been added, the bonding formulation was allowed to mix for approximately 5 minutes prior to use in the spraying operation. For this bonding formulation, the weight percent ratio of epoxy-functional polymer based on carboxylic acid-functional polymer was about 5.0%. The solids content of the bonding formulation was approximately 8.4%.

The bonding formulation was sprayed onto one side of the basesheet using an air pressurized spray. The spray nozzle was a TEEJET model 8001-E and operated at an air pressure of 100 pounds per square inch gauge (psig). The nozzle was approximately 22 centimeters (cm) from the substrate during application. After application of the bonding formulation, the sheet was dried using a hot air oven (Mathis Type LTV 51793, Concord, N.C.) operating at 100° C. for 30 seconds. The dried sheet was then weighed to determine bonding formulation add-on and finished basis weight. Bonded samples were then naturally aged for 14 days at room temperature (about 23° C.) and humidity (about 50% relative humidity) prior to measuring the tensile strength properties.

Example 13 (Invention)

A single-ply, two-side bonded sheet was produced by spray application of a low odor, room temperature-curing bonding formulation. Specifically, an UCTAD tissue basesheet was prepared as described in Example 12. The bonding formulation of Example 12 was also used.

The bonding formulation was sprayed onto one side of the basesheet using an air pressurized spray. After application of the bonding formulation, the sheet was dried using a hot air oven operating at 100° C. for 30 seconds. The same bonding formulation was then applied to the non-treated side of the dried sheet and the sheet was again dried using a hot air oven for an additional 30 seconds. After the second drying step, the sheet was weighed to determine bonding formulation add-on and finished basis weight. Bonded samples were then naturally aged for 14 days at room temperature (about 23° C.) and humidity (about 50% relative humidity) before testing for tensile strengths.

The test results from Examples 12 and 13 appear in Table 2 below. Reported values are the average of three representative samples rather than six.

additional thermal curing. The resulting sheet was tested for physical properties after natural aging at room temperature (about 23° C.) and humidity (about 50% relative humidity).

More specifically, the basesheet was made from a stratified fiber furnish containing a center layer of fibers positioned between two outer layers of fibers. Both outer layers of the UCTAD basesheet contained 100% northern softwood kraft pulp and about 3.5 kilograms (kg)/metric ton (Mton) of dry fiber of a debonding agent, ProSoft® TQ1003 (Hercules, Inc.). Combined, the outer layers comprised 50% of the total fiber weight of the sheet (25% in each layer). The center layer, which comprised 50% of the total fiber weight of the sheet, was also comprised of northern softwood kraft pulp. The fibers in this layer were also treated with 3.5 kg/Mton of ProSoft® TQ1003 debonder.

The machine-chest furnish containing the chemical additives was diluted to approximately 0.2 percent consistency and delivered to a layered headbox. The forming fabric speed was approximately 445 meters per minute. The resulting web was then rush-transferred to a transfer fabric (Voith Fabrics, 807) traveling 15% slower than the forming fabric using a vacuum box to assist the transfer. At a second vacuum-assisted transfer, the web was transferred and wet-molded onto the through drying fabric (Voith Fabrics, t1203-8). The web was dried with a through-air-dryer resulting in a basesheet with an air-dry basis weight of approximately 45 grams per square meter (gsm).

The resulting sheet was fed to a gravure printing line, similar to that shown in FIG. 1, traveling at about 200 feet per minute (61 meters per minute) where a latex binder was printed onto the surface of the sheet. The first side of the sheet was printed with a bonding formulation using direct rotogravure printing. Then the printed web passed over a heated roll

TABLE 2

| Example | Basesheet Air Dry Wt. g | Basesheet Oven Dry Wt. g | Basis Weight gsm | Sprayed # Sides | Sprayed Dry Wt. g | Add-on % |
|---|---|---|---|---|---|---|
| 12 | 4.83 | 4.54 | 54.1 | 1 | 4.81 | 6.0 |
| 13 | 4.88 | 4.60 | 54.9 | 2 | 5.13 | 11.4 |

| Example | MD Tensile g/76.2 mm | MD Stretch % | MD TEA g * cm/sq. cm | MD Slope g | CD Tensile g/76.2 mm | CD Stretch % | CD TEA g * cm/sq. cm | CD Slope g |
|---|---|---|---|---|---|---|---|---|
| 12 | 5066 | 17.6 | 53.2 | 20036 | 4100 | 9.9 | 24.5 | 14711 |
| 13 | 10206 | 18.1 | 52.2 | 19889 | 7458 | 10.1 | 22.9 | 15208 |

| Example | CD Wet Tensile Water g/76.2 mm | CD Wet Stretch % | Wet/Dry % | CD Wet Tensile Formula 409(pH 11.5) g/76.2 mm |
|---|---|---|---|---|
| 12 | 1477 | 5.8 | 36 | 1015 |
| 13 | 3281 | 7.5 | 44 | 2584 |

Table 2 demonstrates the ability of the inventive binder to improve both the dry and wet tensile properties of a web when applied via spray application to one or two sides of the material. Strength development is achieved without the use of a high temperature cure step.

Example 14 (Comparative for Examples 15-18)

A single-ply bonded sheet was produced generally as described in Example 1. After manufacture on the tissue machine, the UCTAD basesheet was printed on each side with a latex-based binder. The binder-treated sheet was adhered to the surface of a Yankee dryer to re-dry the sheet and thereafter the sheet was creped and wound onto a roll without any with a surface temperature of approximately 104° C. to evaporate water. Next, the second side of the sheet was printed with the bonding formulation using a second direct rotogravure printer. The sheet was then pressed against and doctored off a rotating drum, which had a surface temperature of approximately 104° C. Finally the sheet was cooled by passing room temperature air through the sheet prior to winding into a roll. The temperature of the wound roll was measured to be approximately 24° C.

The bonding formulation for this example was prepared as two separate mixtures, called the "latex" and "reactant". The "latex" material contained the epoxy-reactive polymer and the "reactant" was the epoxy-functional polymer. Each mixture was made up independently and then combined together prior to use. After the latex and reactant mixtures were combined, the appropriate amount of "thickener" (Natrosol solution) was added to adjust viscosity. The "latex" and "reactant" mixtures contained the following ingredients, listed in their order of addition.

| Latex | |
|---|---|
| 1. Airflex ® 426 (62.7% solids) | 34,200 g |
| 2. Defoamer (Nalco 7565) | 205 g |
| 3. Water | 6,105 g |
| 4. LiCl solution tracer (10% solids) | 206 g |

| Reactant | |
|---|---|
| 1. Kymene ® 2064 (20% solids) | 5,420 g |
| 2. Water | 10,010 g |
| 3. NaOH (10% solution) | 2,800 g |

When the NaOH had been added, the pH of the reactant mixture was approximately 12. After all reactant ingredients were added, the mixture was allowed to mix for at least 15 minutes prior to adding to the latex mixture.

| Thickener | |
|---|---|
| 1. Natrosol 250MR, Hercules (2% solids) | 1,650 g |

After all ingredients had been added, the print fluid was allowed to mix for approximately 5-30 minutes prior to use in the gravure printing operation. For this bonding formulation, the weight percent ratio of epoxy-functional polymer based on carboxylic acid-functional polymer (epoxy-reactive polymer) was about 5%.

The viscosity of the print fluid was 125 cps, when measured at room temperature using a viscometer (Brookfield® Synchro-lectric viscometer Model RVT, Brookfield Engineering Laboratories Inc. Stoughton, Mass.) with a #1 spindle operating at 20 rpm. The oven-dry solids of the print fluid was 38.1 weight percent. The print fluid pH was 5.0.

Thereafter the print/print/creped sheet was removed from the roll and tested for basis weight, tensile strength and sheet blocking.

Example 15

Low Blocking: 5% Kymene 2064, 10% Glyoxal

A single-ply bonded sheet was produced as described in Example 14, but using a binder recipe which was designed to reduce blocking in the finished roll. The ingredients of the "latex", "reactant", "anti-blocking additive" and "thickener" are listed below.

| Latex | |
|---|---|
| 1. Airflex ® 426 (62.7% solids) | 6772 g |
| 2. Defoamer (Nalco 7565) | 41 g |
| 3. Water | 1,209 g |
| 4. LiCl solution tracer (10% solids) | 41 g |

| Reactant | |
|---|---|
| 1. Kymene ® 2064 (20% solids) | 1,073 g |
| 2. Water | 1,982 g |
| 3. NaOH (10% solution) | 544 g |

When the NaOH had been added, the pH of the reactant mixture was approximately 12. After all reactant ingredients were added, the mixture was allowed to mix for at least 15 minutes prior to adding to the latex mixture. The anti-blocking additive was added next, followed by the thickener to achieve desired viscosity.

| Anti-Blocking Additive | |
|---|---|
| 1. Glyoxal (40%) | 1,096 g |

| Thickener | |
|---|---|
| 1. Natrosol 250MR, Hercules (2% solids) | 326 g |

After all ingredients had been added, the print fluid was allowed to mix for approximately 5-30 minutes prior to use in the gravure printing operation. For this bonding formulation, the weight percent ratio of epoxy-functional polymer based on carboxylic acid-functional polymer was about 5.0% and the weight percent ratio of glyoxal based on carboxylic acid-functional polymer was about 10%. The viscosity of the print fluid was 98 cps, when measured at room temperature using a viscometer (Brookfield® Synchro-lectric viscometer Model RVT, Brookfield Engineering Laboratories Inc. Stoughton, Mass.) with a #1 spindle operating at 20 rpm. The print fluid pH was 4.9.

The resulting single-ply bonded sheet was tested for tensile strength, basis weight and sheet blocking.

Example 16

Low Blocking: 5% Kymene 2064, 20% Glyoxal

A single-ply bonded sheet was produced as described in Example 14, but using a binder recipe which was designed to reduce blocking in the finished roll. The ingredients of the "latex", "reactant", "anti-blocking additive" and "thickener" are listed below.

| Latex | |
|---|---|
| 1. Airflex ® 426 (62.7% solids) | 6,292 g |
| 2. Defoamer (Nalco 7565) | 40 g |
| 3. Water | 956 g |
| 4. LiCl solution tracer (10% solids) | 40 g |

| Reactant | |
|---|---|
| 1. Kymene ® 2064 (20% solids) | 997 g |
| 2. Water | 1,842 g |
| 3. NaOH (10% solution) | 505 g |

When the NaOH had been added, the pH of the reactant mixture was approximately 12. After all reactant ingredients were added, the mixture was allowed to mix for at least 15 minutes prior to adding to the latex mixture. The anti-blocking additive was added next, followed by the thickener to achieve desired viscosity.

Anti-Blocking Additive

1. Glyoxal (40%) 1,950 g

Thickener

1. Natrosol 250MR, Hercules (2% solids) 304 g

After all ingredients had been added, the print fluid was allowed to mix for approximately 5-30 minutes prior to use in the gravure printing operation. For this bonding formulation, the weight percent ratio of epoxy-functional polymer based on carboxylic acid-functional polymer was about 5.0% and the weight percent ratio of glyoxal based on carboxylic acid-functional polymer was about 20%. The viscosity of the print fluid was 95 cps, when measured at room temperature using a viscometer (Brookfield® Synchro-lectric viscometer Model RVT, Brookfield Engineering Laboratories Inc. Stoughton, Mass.) with a #1 spindle operating at 20 rpm. The print fluid pH was 4.8.

The resulting single-ply bonded sheet was tested for tensile strength, basis weight and sheet blocking.

Example 17

Low Blocking: 10% Kymene 2064, 10% Glyoxal

A single-ply bonded sheet was produced as described in Example 14, but using a binder recipe which was designed to reduce blocking in the finished roll. The ingredients of the "latex", "reactant", "anti-blocking additive" and "thickener" are listed below.

| Latex | |
|---|---|
| 1. Airflex ® 426 (62.7% solids) | 17,200 g |
| 2. Defoamer (Nalco 7565) | 100 g |
| 3. Water | 0 g |
| 4. LiCl solution tracer (10% solids) | 100 g |

| Reactant | |
|---|---|
| 1. Kymene ® 2064 (20% solids) | 5,475 g |
| 2. Water | 8,000 g |
| 3. NaOH (10% solution) | 2,800 g |

When the NaOH had been added, the pH of the reactant mixture was approximately 12. After all reactant ingredients were added, the mixture was allowed to mix for at least 15 minutes prior to adding to the latex mixture. The anti-blocking additive was added next, followed by the thickener to achieve desired viscosity.

| Anti-Blocking Additive | |
|---|---|
| 1. Glyoxal (40%) | 2,715 g |

| Thickener | |
|---|---|
| 1. Natrosol 250MR, Hercules (2% solids) | 0 g |

After all ingredients had been added, the print fluid was allowed to mix for approximately 5-30 minutes prior to use in the gravure printing operation. For this bonding formulation, the weight percent ratio of epoxy-functional polymer based on carboxylic acid-functional polymer was about 10% and the weight percent ratio of glyoxal based on carboxylic acid-functional polymer was about 10%. The viscosity of the print fluid was 120 cps, when measured at room temperature using a viscometer (Brookfield® Synchro-lectric viscometer Model RVT, Brookfield Engineering Laboratories Inc. Stoughton, Mass.) with a #1 spindle operating at 20 rpm. The print fluid pH was 5.2.

The resulting single-ply bonded sheet was tested for tensile strength, basis weight and sheet blocking.

Example 18

Low Blocking: 10% Kymene 2064, 10% Glyoxal, 10% Wax in First Print Station

A single-ply bonded sheet was produced as described in Example 17, but using a binder recipe which included an additional anti-blocking additive in the first print fluid. The additional anti-blocking additive was a microcrystalline wax, Michem® Emulsion 48040 (sold by Michelman, Inc., Cincinnati, Ohio). Michem Emulsion 48040 is a 40% actives, nonionic emulsion of microcrystalline wax. The wax has a melt point of 88° C. For purposes of reducing blocking, the wax was only added to the first printed side of the basesheet. The wax was added at an addition level of about 10% based on the weight of the latex polymer in the first print fluid. The print fluid for the second printed side was identical to that described in Example 17.

The resulting single-ply bonded sheet was tested for tensile strength, basis weight and sheet blocking. Testing was conducted after 15 days of natural aging.

Table 3 shows the testing results of tensile strength, basis weight and blocking measurements for Examples 14-18.

TABLE 3

| Example | MD Tensile g/76.2 mm | MD Stretch % | CD Tensile g/76.2 mm | CD Stretch % | CD Wet Tensile (water) g/76.2 mm | CD Wet/Dry (%) | Blocking (g) | Basis Weight (gsm) |
|---|---|---|---|---|---|---|---|---|
| 14 Control | 1667 | 45.9 | 1305 | 18.5 | 637 | 48 | 25.1 | 57.0 |
| 15 | 1649 | 40.5 | 1257 | 16.9 | 725 | 58 | 17.6 | 56.2 |
| 16 | 1652 | 42.6 | 1214 | 15.5 | 639 | 53 | 15.0 | 56.8 |
| 17 | 1614 | 33.7 | 1210 | 15.4 | 777 | 64 | 6.6 | 55.1 |
| 18 | 1396 | 38.4 | 1196 | 14.2 | 820 | 69 | 4.3 | 56.7 |

From Table 3, it can be seen that the addition of antiblocking additives to the print fluid (Examples 15-18) significantly reduced the measured blocking value versus the control code (Example 14). Other key sheet attributes were either maintained or improved, such as CD wet tensile strength.

In the interests of brevity and conciseness, any ranges of values set forth in this specification are to be construed as written description support for claims reciting any sub-ranges having endpoints which are whole number values within the specified range in question. By way of a hypothetical illustrative example, a disclosure in this specification of a range of 1-5 shall be considered to support claims to any of the following sub-ranges: 1-4; 1-3; 1-2; 2-5; 2-4; 2-3; 3-5; 3-4; and 4-5.

It will be appreciated that the foregoing examples, given for purposes of illustration, are not to be construed as limiting the scope of this invention, which is defined by the following claims and all equivalents thereto.

We claim:

1. An aqueous binder composition comprising an unreacted mixture of a carboxylated vinyl acetate-ethylene terpolymer emulsion and a water-soluble poly(methyldiallylamine)-epichlorohydrin resin having 4 or more pendant epoxy groups, wherein the amount of the water-soluble poly(methyldiallylamine)-epichlorohydrin resin relative to the amount of the carboxylated vinyl acetate-ethylene terpolymer emulsion is from about 0.5 to about 25 weight percent on a solids basis, said composition further comprising an antiblocking additive selected from the group consisting of glyoxal, glutaraldehyde and glyoxalated polyacrylamides.

2. The composition of claim 1 wherein the number of pendant epoxy groups is about 10 or more.

3. The composition of claim 1 wherein the number of pendant epoxy groups is about 50 or more.

4. The composition of claim 1 wherein the number of pendant epoxy groups is about 100 or more.

5. The composition of claim 1 wherein the number of pendant epoxy groups is from about 10 to about 2000.

6. The composition of claim 1 wherein the number of pendant epoxy groups is from about 10 to about 1000.

7. The composition of claim 1 wherein the number of pendant epoxy groups is from about 25 to about 1000.

8. The composition of claim 1 wherein the amount of the water-soluble poly(methyldiallylamine)-epichlorohydrin resin relative to the amount of the carboxylated vinyl acetate-ethylene terpolymer emulsion is from about 1 to about 20 weight percent.

9. The composition of claim 1 wherein the amount of the water-soluble poly(methyldiallylamine)-epichlorohydrin resin relative to the amount of the carboxylated vinyl acetate-ethylene terpolymer emulsion is from about 2 to about 10 weight percent.

10. The composition of claim 1 wherein the amount of the water-soluble poly(methyldiallylamine)-epichlorohydrin resin relative to the amount of the carboxylated vinyl acetate-ethylene terpolymer emulsion is from about 5 to about 10 weight percent.

11. The composition of claim 1 further comprising a wax.

12. An aqueous binder composition comprising an unreacted mixture of a carboxylated vinyl acetate-ethylene terpolymer emulsion and a water-soluble poly(methyldiallylamine)-epichlorohydrin resin having 4 or more pendant epoxy groups, wherein the amount of the water-soluble poly(methyldiallylamine)-epichlorohydrin resin relative to the amount of the carboxylated vinyl acetate-ethylene terpolymer emulsion is from about 0.5 to about 25 weight percent on a solids basis, said composition further comprising glyoxal.

* * * * *